INVENTORS
William H. South &
John H. Taylor.

BY
Clement L. McHale
ATTORNEY

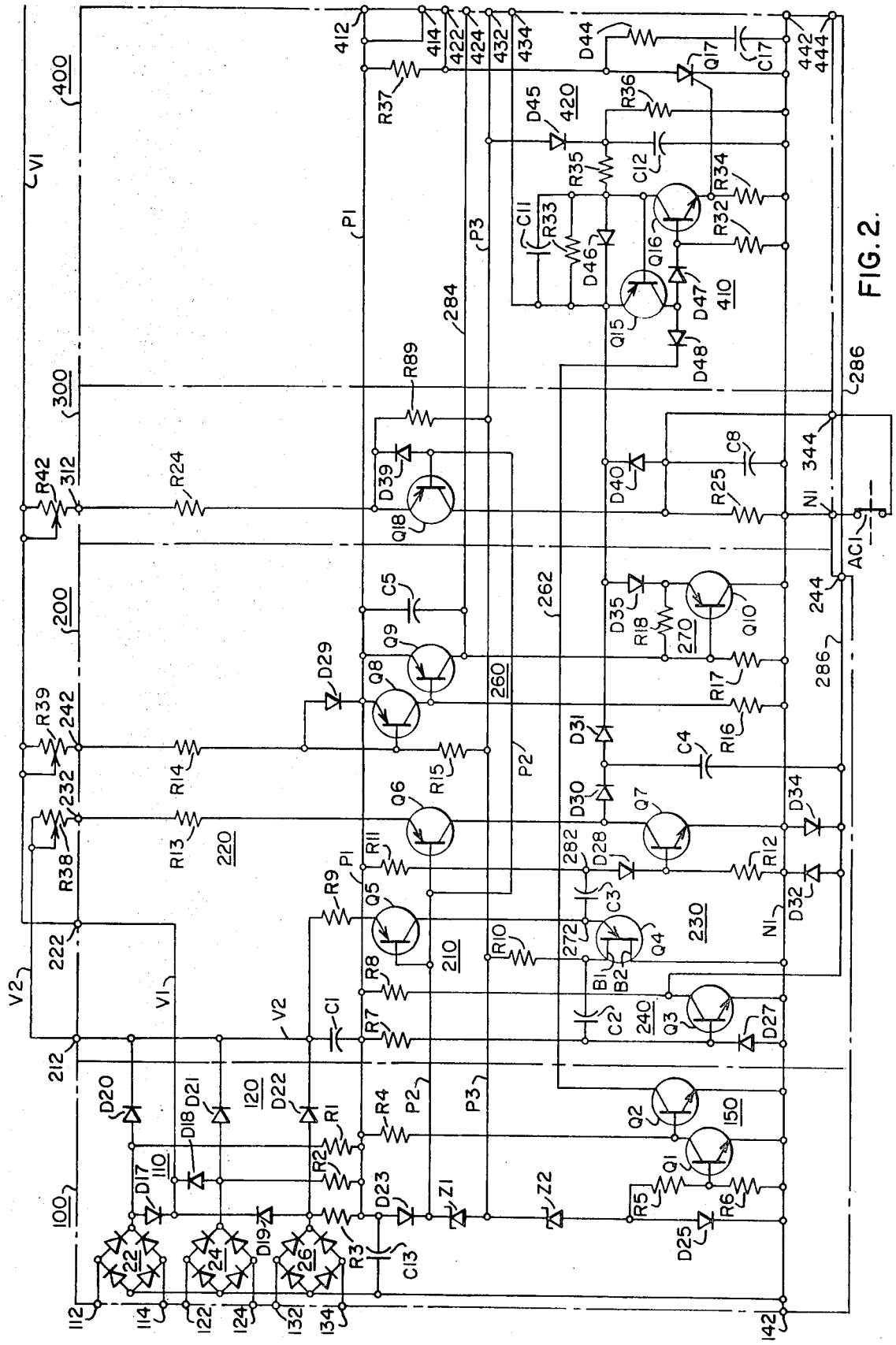

United States Patent Office 3,543,094
Patented Nov. 24, 1970

3,543,094
OVERCURRENT PROTECTIVE DEVICE
William H. South, McKeesport, and John H. Taylor, Pittsburgh, Pa., assignors to Westinghouse Electric Corporation, Pittsburgh, Pa., a corporation of Pennsylvania
Filed Oct. 7, 1968, Ser. No. 765,552
Int. Cl. H01h *47/18, 3/22*
U.S. Cl. 317—36
6 Claims

ABSTRACT OF THE DISCLOSURE

An overcurrent protective device of the time delay type is provided which is responsive to the current in an electrical circuit which is being protected to actuate the tripping or opening of an associated circuit breaker upon the occurrence of predetermined operating conditions. The protective device includes a first means which is responsive substantially instantaneously when the current in the protected circuit exceeds a predetermined value and second means which is responsive to certain overcurrents after a predetermined time delay which may vary inversely with the overcurrent and the associated circuit breaker includes a means which is operatively connected to the first means of the protective device to render the first means inoperative or to inhibit the operation of the first means of the protective device during certain operating conditions of the associated circuit breaker.

CROSS-REFERENCES TO RELATED APPLICATIONS

Certain inventions disclosed in the present application are disclosed and claimed in copending application Ser. No. 765,584, filed concurrently by J. D. Watson, F. T. Thompson and F. O. Johnson, copending application Ser. No. 765,582, filed concurrently by J. D. Watson, and copending application Ser. No. 765,583, filed concurrently by J. D. Watson, which are all assigned to the same assignee as the present application.

BACKGROUND OF THE INVENTION

This invention relates to overcurrent protective devices and more particularly to such devices of the time delay type which may be used to control the operation of an associated circuit breaker.

If a particular circuit breaker is limited with respect to the maximum current against which the contacts of the circuit breaker can be closed by the operating mechanism of the circuit breaker and remain latched in a closed condition, whatever overcurrent protective device is associated with the circuit breaker to control its operation should actuate the circuit breaker to trip substantially instantaneously if the circuit breaker should attempt to close against a fault current which exceeds a predetermined value which is the maximum current against which the operating mechanism of the circuit breaker is capable of closing and latching in the contacts of the circuit breaker. Once the circuit breaker is closed and the contacts are latched in however, the associated protective device should not necessarily actuate the circuit breaker to trip substantially instantaneously if a fault current of the same predetermined value should occur since the operating mechanism of the circuit breaker may be capable of maintaining the contacts of the circuit breaker closed against such a fault current for at least a short time which may be coordinated with the short time delay operating characteristics of the associated protective device. It is therefore desirable to provide an improved overcurrent protective device having substantially instantaneous operating characteristics which are coordinated with the closing capability of the associated circuit breaker and whose operating characteristics are modified after the main contacts of the associated circuit breaker are closed and latched in.

SUMMARY OF THE INVENTION

In accordance with the invention, an overcurrent protective device is provided including first means for responding substantially instantaneously to a first predetermined value of current to provide a first output and second means for responding to a second predetermined value current after a predetermined time delay to provide a second output. The associated circuit breaker includes means operatively connected to the first means of the protective device and actuated by the closing of the circuit breaker for rendering the first means inoperative or for inhibiting the operation of the first means during certain operating conditions of the circuit breaker. An auxiliary contact means is provided as part of the circuit breaker to be actuated by a closing operation of the circuit breaker and is operatively connected to the first means of the associated protective device to operatively cancel or inhibit the output of the first means of the protective device. In another aspect of the applicants' invention, the protective device may include first and second means for responding substantially instantaneously to first and second predetermined values of current respectively to provide separate outputs and the auxiliary contact means on the associated circuit breaker may operatively cancel or inhibit the output of only one of the last-mentioned means after the main contacts of the circuit breaker are actuated to a closed position and latched in.

It is therefore an object of this invention to provide an improved circuit breaker including an overcurrent protective device which will have certain predetermined operating characteristics when the circuit breaker is open and different predetermined operating characteristics when the circuit breaker is closed.

BRIEF DESCRIPTION OF THE DRAWINGS

Other objects of the invention will be apparent from the following detailed description taken in conjunction with the accompanying drawings in which:

FIG. 2 is a detailed schematic diagram of a portion of the protective device which is shown in block form in FIG. 1.

DESCRIPTION OF THE PREFERRED EMBODIMENTS

Figure 1:
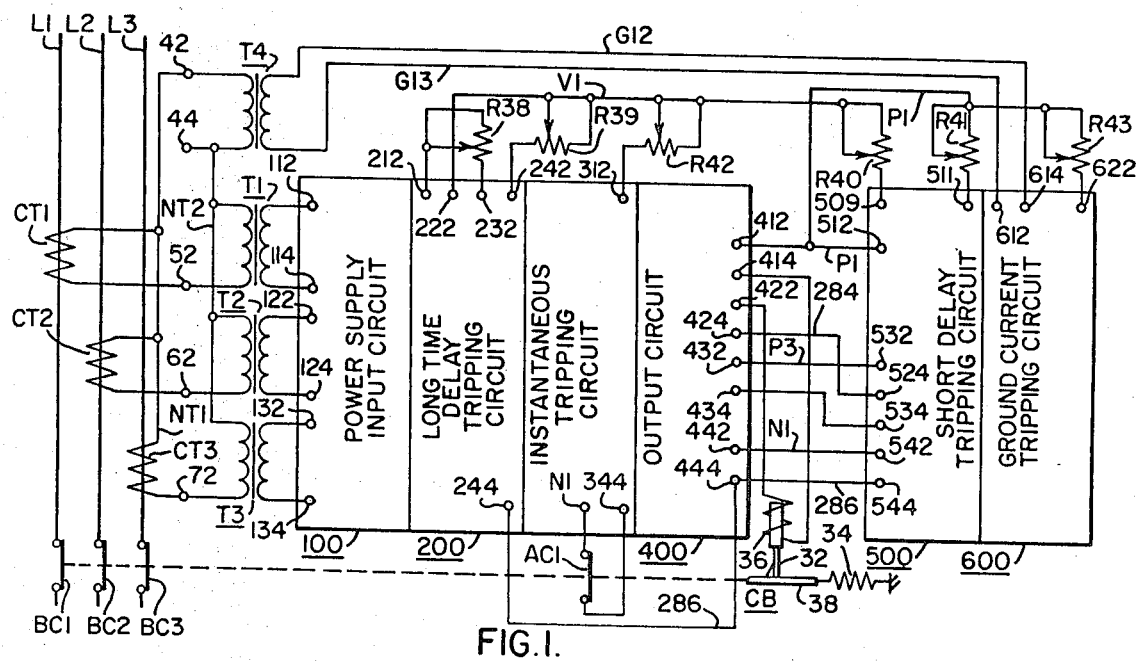
FIG. 1 is a schematic diagram, partly in block form, of an overcurrent protective relay device of the time delay type embodying the invention and associated with a circuit breaker.

Referring now to the drawings and FIG. 1 in particular, there is illustrated an overcurrent protective relay device which is provided to protect an electrical power system or circuit which includes the line conductors L1, L2 and L3 and an associated circuit breaker CB whose operation is controlled by the protective relay device. The electrical system may be of any desired type such as a single phase system or a polyphase system. It will be assumed for purposes of the present description that the electrical system is a three-phase alternating current system represented by the line conductors L1, L2 and L3 and designed for operation at a frequency of 60 cycles per second.

The circuit breaker CB is provided for segregating or isolating portions of the electrical system under certain abnormal or fault conditions, such as an overcurrent condition. The circuit breaker CB includes a plurality of separable or relatively movable main line contacts BC1, BC2 and BC3 which are closed when the circuit breaker is closed and which are opened when the circuit breaker is opened. The circuit breaker CB also includes an auxiliary contact means, as indicated at AC1, which is arranged to close a short time after the main contacts BC1, BC2 and BC3 are closed during the operation of said circuit breaker. In addition, the circuit breaker CB also includes a trip coil 36 which when energized while the circuit breaker is closed results in a tripping or opening operation of the main contacts of the circuit breaker CB. As illustrated diagrammatically in FIG. 1, energization of the trip coil 36 may actuate an operating member 32 which forms part of the operating mechanism of the circuit breaker CB to release a latch member 38 to thereby actuate an opening operation of the main contacts BC1, BC2 and BC3 under the influence of a suitable operating means, such as the spring 34, which may be operatively connected to said main contacts as indicated at 33. Similarly, the main contacts BC1, BC2 and BC3 may be actuated to a closed position by a suitable operating means, such as a closing spring or means (not shown) which is operatively connected to said contacts by a suitable coupling means, such as indicated at 33 for the opening spring 34.

In general, the protective device shown in FIG. 1 is arranged to respond to the highest of the line currents which flow in the conductors L1, L2 and L3 to energize the trip coil 36 and to actuate the tripping of the circuit breaker CB after a time delay which is initiated when the highest of the line currents in said conductors exceeds a predetermined value and which may vary substantially inversely with the square of the highest of said line currents for a predetermined range of overcurrents in said conductors. The protective device shown in FIG. 1 also responds to the highest of the line currents in the line conductors L1, L2 and L3 to energize the trip coil 36 and to actuate the tripping of the circuit breaker CB in a substantially instantaneous manner without any intentional time delay when the highest of the line currents in said conductors exceeds a predetermined value depending upon the operating condition of the circuit breaker CB upon the operating condition of the circuit the tripping of the circuit breaker CB after a substantially fixed or predetermined time delay when the highest of the line currents in said conductors exceeds a predetermined value. In addition, where required, the protective device shown in FIG. 1 may respond to a predetermined ground current in the electrical system which includes the conductors L1, L2 and L3 to energize the trip coil 36 and to actuate tripping of the circuit breaker CB after a substantially fixed or predetermined time delay when the ground current exceeds a predetermined value which initiates the start of the substantially fixed or predetermined time delay.

In order to obtain a plurality of output currents which are directly proportional to the line currents in the line conductors L1, L2 and L3, a plurality of current transformers or sensors CT1, CT2 and CT3 are provided, as shown in FIG. 1, with the primary windings of said current transformers being energized in accordance with the line currents in the line conductors L1, L2 and L3, respectively. The secondary windings of the current transformers CT1, CT2 and CT3 are Y connected between the neutral terminal or conductor NT1 and the respective output terminals 52, 62 and 72. In order to further step down the output currents of the current transformers CT1, CT2 and CT3, the intermediate transformers T1, T2 and T3 which may be of the saturating type, are connected between the secondary windings of said current transformers and the input terminals of the power supply input circuit 100 of the protective device shown in FIG. 1. More specifically, the primary windings of the transformers T1, T2 and T3 are Y connected between the output terminals 52, 62 and 72, respectively, of the current transformers CT1, CT2 and CT3, respectively, and the neutral terminal NT2 with the neutral terminal NT2 being connected to the neutral terminal NT1 of said current transformers through the primary winding of a ground current transformer T4 where ground current tripping protection is not required, the neutral terminal NT2 at the terminal 44 of the primary winding of the ground current transformer T4 may be directly connected to the neutral terminal NT1 of the current transformers CT1, CT2 and CT3. The secondary windings of the intermediate transformers T1, T2 and T3 are connected to the input terminals 112 and 114, 122 and 124, and 132 and 134, respectively, of the power supply input circuit 100 of the protective device shown in FIG. 1 to provide three output currents which, in turn, are directly proportional to the line currents in the line conductors L1, L2 and L3 of the electrical system, as illustrated.

In order to rectify the alternating current outputs of the transformers T1, T2 and T3, the power supply input circuit 100 of the protective device shown in FIG. 1 includes a plurality of full wave rectifiers 22, 24 and 26, as illustrated in FIG. 2 of the drawings. As shown in FIG. 2, the input terminals of the full wave rectifier 22 are connected to the terminals 112 and 114 which, in turn, are connected across the secondary winding of the transformer T1. Similarly, the input terminals of the full wave rectifiers 24 and 26 at the terminals 122 and 124 and 132 and 134, respectively, are connected across the secondary windings of the transformers T2 and T3, respectively.

POWER SUPPLY INPUT CIRCUIT 100

In order to develop a plurality of unidirectional voltages which correspond to and are directly proportional to the line currents in the conductors L1, L2 and L3, the power supply input circuit 100 of the protective device includes a plurality of resistors R1, R2 and R3 whose upper ends are connected to the positive output terminals of the full wave rectifiers 22, 24 and 26, respectively. The lower ends of the resistors R1, R2 and R3 are electrically connected together at the conductor P1. One or more filter capacitors, as indicated at C13 in FIG. 2, is connected between the conductor P1 and the negative output terminals of the full wave rectifiers 22, 24, 26 which are electrically connected together to a common terminal, as indicated at the conductor N1. In order to provide a plurality of regulated, filtered unidirectional voltages for the balance of the protective device shown in FIGS. 1 and 2, a series circuit is connected electrically in parallel with the capacitor C13 between the conductor P1 and the common conductor N1 which includes the forward connected diode D23, a first reversely poled Zener diode Z1, a second reversely poled Zener diode Z2 and a forward connected diode D25.

When the power supply input circuit 100 is initially energized from the current transformers CT1, CT2 and CT3 and the associated transformers T1, T2, T3, the three output currents from the full wave rectifiers 22, 24 and 26 flow through the resistors R1, R2 and R3, respectively, to develop three unidirectional voltages which are directly proportional to the line currents in the conductors L1, L2 and L3, respectively, and to charge the capacitor C13. The voltage across the capacitor C13 increases as the capacitor is charged from the full wave rectifiers 22, 24 and 26 until the voltage across the capacitor C13 is sufficient to cause the Zener diodes Z1 and Z2 to break down and limit the voltage across the capacitor C13 to substantially a predetermined value which is equal to the total of the forward voltage drops across the diodes D23 and D25 and the reverse breakdown voltages across the Zener diodes Z1 and Z2. The regulated and filtered voltage across the capacitor C13 which is available between the conductors P1 and N1 may, for example, be of the order of 33 volts, while the voltage available between the conductor P2 and the common conductor N1 will be less than the voltage between the conductors P1 and N1 by the forward voltage drop across one or more diodes, as indicated by the diode D23. Similarly, the regulated voltage available between the conductor P3 and the common conductor N1 will be less than the voltage between the conductors P1 and N1 by the forward voltage drop across the diode D23 and the reverse breakdown voltage across the Zener diode Z1. It is to be noted that after the Zener diodes Z1 and Z2 break down during the initial charging of the capacitor C13, the three unidirectional output currents from the full wave rectifiers 22, 24 and 26 will flow from the positive terminals of said rectifiers through the respective resistors R1, R2 and R3 to the conductor P1 and then through the series circuit which includes the diode D23, the Zener diodes Z1 and Z2 and the diode 25 to the common conductor N1 which is connected to the negative output terminals of the rectifiers 22, 24 and 26.

In order to obtain a first unidirectional voltage which varies only with the highest of the three unidirectional voltages across the resistors R1, R2, R3 and, in turn, only with the highest of the line currents in the conductors L1, L2 and L3, the power supply input circuit 100 includes a first auctioneering circuit 110 which comprises the diodes D17, D18 and D19. The diodes D17, D18 and D19 are forward connected between the upper ends of the resistors R1, R2 and R3, respectively, at the positive output terminals of the rectifiers 22, 24 and 26, respectively, and a common variable voltage output conductor or bus V1, as shown in FIG. 2. The unidirectional output voltage of the first auctioneering circuit 110 which is available or appears between the conductor V1 and the conductor P1 will be equal to the highest voltage across the resistors R1, R2 and R3 less the forward voltage drop across one of the diodes D17, D18 and D19 since, if the unidirectional voltage across one of said resistors exceeds the unidirectional voltages across the other two of said resistors, two of the three diodes D17, D18 and D19 will be blocked or reversed biased by the highest unidirectional voltage which is present between the conductors V1 and P1. It is important to note that the unidirectional output voltage which appears between the conductors V1 and P1 is unfiltered, for reasons which will be explained hereinafter.

In order to establish a second unidirectional output voltage which varies only with the highest of the three unidirectional voltages across the resistors R1, R2 and R3 and, in turn, with only the highest of the line currents in the conductors L1, L2 and L3, the power supply input circuit 100 includes a second auctioneering circuit 120 which includes the diodes D20, D21 and D22. Similarly to the diodes of the first auctioneering circuit 100, the diodes D20, D21 and D22 are connected to the upper ends of the resistors R1, R2 and R3, respectively, at the positive output terminals of the rectifiers 22, 24 and 26, respectively, and a common variable voltage output conductor V2 which forms part of the long time delay tripping circuit 200, as shown in FIG. 2. The unidirectional output voltage of the second auctioneering circuit 120 is available between the conductors V2 and the conductor P1 and is equal to the highest of the three unidirectional output voltages across the resistors R1, R2 and R3 less the forward voltage drop across one of the diodes D20, D21 and D22. The unidirectional output voltage of the second auctioneering circuit 120 is filtered by the capacitor C1 which is connected between the conductor V2 and the conductor P1. The second auctioneering circuit 120 operates similarly to the first auctioneering circuit 110 in that when one of the three unidirectional voltages across the resistors R1, R2, R3 exceeds the other two unidirectional voltages, two of the forward connected diodes D20, D21 and D22 will be blocked or reversed biased.

In order to prevent the operation of the protective device shown in FIG. 1, prior to the time that the capacitor C13, which may include one or more energy storing capacitors in a particular application, is fully charged or in the event that the capacitor C13 should not be fully charged during the operation of the protective device shown in FIG. 1, the power supply input circuit 100 includes the control means or circuit 150 which comprises the NPN transistors Q1 and Q2, as shown in FIG. 2. In general, the control means 150 of the power supply input circuit 100 is provided to insure that the capacitor C13 has acquired sufficient charge or stored energy to adequately energize the trip coil 36 of the circuit breaker CB when called upon to do so during the operation of the protective device shown in FIG. 1, as will be explained in greater detail hereinafter. More specifically, the control means 150 of the power supply input circuit 100 includes a voltage dividing network which comprises the resistors R5 and R6 connected in series with one another, the series circuit being electrically connected in parallel with the diode D25 between the anode of the diode D25 and the common or negative conductor N1. When the capacitor C13 is fully charged and the Zener diodes Z1 and Z2 break down, the diode D25 limits the voltage across the series circuit which includes the resistors R5 and R6 to the forward voltage drop of the diode D25. In order to apply a drive current to the base of the transistor Q1 when the capacitor C13 is fully or adequately charged, the base of the transistor Q1 is connected to the junction point between the resistors R5 and R6, while the emitter of the transistor Q1 is connected to the common conductor NN1. The collector of the transistor Q1 is connected to the conductor P1 through a collector load resistor R4 and is also directly connected or coupled to the base of the transistor Q2. The emitter of the transistor Q2 is also directly connected to the common conductor N1, while the collector of the transistor Q2 is connected to the collector of the transistor Q15 which forms part of the output circuit 400, as shown in FIG. 2, through a conductor 262 and a diode D48 which is a normally blocked or reversed biased, isolating diode, whose purpose wil be explained in more detail hereinafter.

In the operation of the control means 150, prior to the time that the charge on the capacitor C13 and the corresponding voltage thereacross is sufficient to break down the Zener diodes Z1 and Z2 in the reverse direction or whenever the charge on the capacitor C13 and the corresponding voltage thereacross is insufficient to break down said Zener diodes during the operation of the overall protective device shown in FIG. 1, the current flowing in the base-emitter circuit of the transistor Q1 will be insufficient to actuate the transistor Q1 to a saturated condition and the transistor Q1 will therefore be substantially nonconducting or cutoff. Whenever the transistor Q1 is substantially nonconducting or cutoff and a unidirectional output voltage is present at the conductor P1, current will flow from the conductor P1 to the conductor N1 through the resistor R4 and the base-emitter circuit of the transistor Q2 to actuate the transistor Q2 to a saturated condition in which the voltage drop across the collector-emitter circuit of the transistor Q2 will be relatively negligible and the voltage or potential at the conductor 262 will be very close to the potential at the common conductor N1. Whenever the potential at the conductor 262 is held at a value which is very close to the potential at the common conductor N1, the diode D48 in the output circuit 400 of the protective device will be unblocked or forward biased to thereby prevent the operation of the output circuit 400 of the protective device shown in FIG. 1, as will be explained in detail hereinafter.

In the operation of the control means 150, after the capacitor C13 is fully or adequately charged sufficiently to break down the Zener diodes Z1 and Z2 or whenever the charge on the capacitor C13 and the corresponding voltage thereacross is sufficient to break down said Zener diodes in the reverse direction, current will flow through the series circuit which includes the diode D23, the Zener diodes Z1 and Z2, the resistor R5, and the base-emitter of the transistor Q1 which is sufficient to actuate the transistor Q1 to a saturated condition in which the current flowing in the collector-emitter circuit of the transistor Q1 is limited only by value of the resistor R4 which is connected in series with the collector of the transistor Q1 and the voltage between the conductor P1 and the conductor N1. When the transistor Q1 is actuated to a saturated condition as just described, the potential at the base of the transistor Q2 will change to a potential which is very close to the potential at the common conductor N1 and the current flow in the base-emitter circuit of the transistor Q2 will be reduced to a value less than that necessary to maintain the transistor Q2 in a saturated condition and the transistor Q2 will therefore be actuated to a substantially nonconducting or cutoff condition. When the transistor Q2 is actuated to a substantially nonconducting or cutoff condition, the potential at the conductor 262 with respect to the potential at the conductor N1 will be raised sufficiently to block or reverse bias the diode D48 and the output circuit 400 of the protective device shown in FIG. 1 will be permitted to operate in normal fashion, since the capacitor C13 will be assured a sufficient charge and corresponding voltage thereacross to energize the trip coil 36 of the circuit breaker CB when called upon to do so during the operation of the protective device, as shown in FIG. 1. It is to be noted that the value of the resistor R6 which forms part of the control means 150 may be selected so as to determine the minimum current in the base-emitter circuit of the transistor Q1 which is necessary to actuate the transistor Q1 from a substantially nonconducting or cutoff condition to a saturated condition to decrease the sensitivity of control means 150, as desired, in a particular application.

LONG TIME DELAY TRIPPING CIRCUIT 200

In general, the long time relay tripping circuit 200 is connected between the power supply input circuit 100 and the output or level detecting circuit 400 of the protective device shown in FIG. 1 to respond to the highest of the unidirectional voltages developed across the resistors R1, R2 and R3 which appear at the conductors V1 and V2 to actuate the output circuit 400 to energize the trip coil 36 of the circuit breaker CB and trip said circuit breaker open whenever the highest of the line currents flowing in the line conductors L1, L2 and L3 exceeds a predetermined value after a time delay which varies substantially inversely with the square of the overcurrent over a predetermined range of overcurrents and which is initiated when the highest of the line currents in said conductors exceeds the predetermined or threshold value as disclosed and claimed in copending application Ser. No. 765,582 previously mentioned. More specifically, the long time delay tripping circuit 200 includes the first and second substantially constant current sources or circuit 210 and 220, respectively, which are connected to the variable voltage output conductor V2 of the second auctioneering circuit 120 for converting the highest of the unidirectional voltages across the resistors R1, R2 and R3 to first and second substantially predetermined unidirectional output currents which are maintained at substantially constant values for a particular value of the highest unidirectional voltage across said resistors independently of changes in the loads connected at the outputs of said current circuits. The unidirectional output currents of the current circuits 210 and 220 which vary in a substantially linear manner with and are directly proportional to the highest of the unidirectional voltages across the resistors R1, R2 and R3 and, in turn, vary in a substantially linear manner with and are directly proportional to the highest of the line currents in the conductors L1, L2 and L3 are then applied to a pulse generating circuit 230 for producing output pulses of unidirectional current whose frequency or repetition rate and magnitude or amplitude both vary in a substantially linear manner with the highest of the line currents in the conductors L1, L2 and L3, with each of said pulses having a substantially predetermined width or duration. The output pulses of unidirectional current from the pulse generating circuit 230 are applied to a timing capacitor or integrating capacitor C4 to cumulatively charge the capacitor C4 when permitted to do so by the level detecting circuit 260 which is connected to the variable voltage conductor V1 to permit the charging of the capacitor C4 when the highest of the line currents in the conductors L1, L2 and L3 exceeds or increases above substantially a predetermined or threshold overcurrent value. When the pulse generating circuit 230 is permitted to charge the capacitor C4 cumulatively, as permitted by the operation of the level detecting circuit 260, the charge across the capacitor C4 increases gradually to a predetermined or threshold value after a time delay which varies substantially inversely with the square of the highest line current in the conductors L1, L2 and L3 to actuate the operation of the output circuit 400 of the protective device shown in FIG. 1 to energize the trip coil 36 of the circuit breaker CB. In order to periodically increase the effective voltage across the timing capacitor C4 for reasons which will be explained hereinafter, the long time delay tripping circiut 200 also includes an auxiliary pulse generating circuit 240 which is responsive to the output pulses of the pulse generating circuit 230 to periodically increase the effective charge and corresponding voltage across the timing or integrating capacitor C4.

More specifically, the first current circuit means 210 is connected to the second auctioneering circuit 120 for converting the highest unidirectional voltage across the resistors R1, R2 and R3 to a first unidirectional output current which is maintained at substantially a predetermined or constant value for a particular value of the highest unidirectional voltage across said resistors and which varies in a substantially linear manner with the highest unidirectional voltage across said resistors. The first current circuit means 210 comprises a PNP transistor Q5 and the resistor R9 which is connected electrically in series with the emitter of the transistor Q5 between the variable voltage conductor V2 at the upper end of the capacitor C1 and the emitter of the transistor Q5. The base of the transistor Q5 is connected to the conductor P2 in order that the input voltage of the first circuit means 210 between the conductors V2 and P2 include the forward voltage drop of the diode D23, which may include one or more forward connected diodes in a particular application, to thereby compensate the input voltage of the first circuit means 210 for the forward voltage drop across one of the diodes D20, D21 and D22 which is connected between one of the resistors R1, R2 and R3 having the highest unidirectional voltage thereacross and the variable conductor V2 and the forward voltage drop across the base-emitter circuit of the transistor Q5. The emitter current of the transistor Q5 is therefore equal to the ratio of the highest unidirectional voltage across one of the resistors R1, R2 and R3 to the value of the resistor R9 which is connected in series with the emitter of the transistor Q5. The unidirectional output current of the first circuit means 210 is available at the collector of the transistor Q5 which is connected to the left side of the capacitor C3 at the terminal 272. In order to maintain the unidirectional output current of the first circuit means 210 at substantially a predetermined or constant value for a particular value of the highest unidirectional voltage across the resistors R1, R2 and R3, the input voltage applied across the series circuit which includes the resistor R9 and the emitter-base circuit of the transistor Q5 should be relatively high, such as the order of 10 to 20 times the forward voltage drop across the emitter-base circuit of the transistor Q5. In addition, the transistor Q5 should have a relatively high current gain or ratio of emitter current to base current, such as of the order of 100, at the particular level of output current at which the transistor Q5 is operating, in order that the base current of the transistor Q5 be negligible compared with the emitter current and the collector current of the transistor Q5 be substantially equal to the emitter current. In the operation of the first circuit means 210, the unidirectional output current at the collector of the transistor Q5 is maintained at a substantially predetermined or constant value for a particular value of the highest unidirectional voltage across the resistors R1, R2 and R3 independent of changes in whatever load circuit is connected to the collector of the transistor Q5 and the unidirectional output current at the collector of the transistor Q5 varies in a substantially linear manner with the highest unidirectional voltage across the resistors R1, R2 and R3 and, in turn, with the highest line current in the conductors L1, L2 and L3.

Similarly, the second current circuit means 220 is connected to the first auctioneering circuit 110 for converting the highest unidirectional voltage across the resistors R1, R2 and R3 to a second unidirectional output current which is maintained at substantially a predetermined or constant value for a particular value of the highest unidirectional voltage across said resistors independent of changes in whatever load circuit is connected to the output of the second current circuit means 220 and which varies in a substantially linear manner with the highest unidirectional voltage across said resistors. The second current circuit means 220 comprises the PNP transistor Q6, the resistor R13 which is connected in series with the emitter of the transistor Q6 and the rheostat or variable resistance means R38 which is connected in series with the resistors R13 and the emitter of the transistor 216 between the second variable voltage conductor V1 and the emitter of the transistor Q6. The base of the transistor Q6 is also connected to the conductor P2 in order that the input voltage of the second circuit means 220 between the conductor V1 and the conductor P2 include the forward voltage drop across the diode D23 to thereby compensate the input voltage of the second current circuit means 220 for the forward voltage drop across one of the diodes D17, D18 and D19 which is connected between one of the resistors R1, R2 and R3 having the highest unidirectional voltage thereacross and the variable voltage conductor V1 and the forward voltage drop across the emitter-base circuit of the transistor Q6. The emitter current of the transistor Q6 is substantially equal to the input voltage of the second circuit means 220 between the conductors V2 and P2 divided by the total resistance of the rheostat R38 and the resistor R13. Since the transistor Q6 is selected to have a relatively high current gain or ratio of emitter current to base current, such as of the order of 100, at the particular level of the emitter current at which the transistor Q6 is operating, the base current of the transistor Q6 is substantially negligible and the unidirectional output current of the transistor Q6 at the collector transistor Q6 is substantially equal to the emitter current of the transistor Q6.

In order that the unidirectional output current of the second circuit means 220 at the collector of the transistor Q6 be maintained at substantially a predetermined constant value for particular value of the highest unidirectional voltage across the resistors R1, R2 and R3, the input voltage applied to the second circuit means 20 between the conductor V2 and the conductor P2 should be relatively large compared with the forward voltage drop in the emitter-base circuit of the transistor Q6. The setting of the rheostat R38 may be adjusted to vary the unidirectional output current of the second circuit means 220 at the collector of the transistor Q6 which corresponds to a particular value of the highest unidirectional voltage across the resistors R1, R2 and R3 and, in turn, with the highest line current in the conductors L1, L2 and L3. It is to be noted that the portion of the input voltage applied to the second circuit means 220 between the conductor V2 and the conductor P1 which is the same input voltage applied to the input of the first circuit means 210 is filtered by the capacitor C1. It is also to be noted that similar to the first circuit means 210, the unidirectional output current of the second circuit means 220 which is available at the collector of the transistor Q6 also varies in a substantially linear manner with the highest unidirectional voltage across the resistors R1, R2 and R3 and, in turn, with the highest line current in the conductors L1, L2 and L3 respectively. The collector of the transistor Q6 of the second current circuit means 220 is connected to the upper side of the timing or integrating capacitor C4 through the diode D30 and cumulatively charges the timing capacitor C4 when permitted to do so by the operation of other portions of the overall protective device shown in FIG. 1 as will be explained hereinafter.

In order to control the application of the unidirectional output current from the second current circuit means 220 to the timing capacitor C4 in the form of periodic pulses of current whose frequency or repetition rate and magnitude or amplitude both vary in a substantially linear manner with and are directly proportional to the highest line current in the conductors L1, L2 and L3 and whose width remains at a substantially predetermined or constant duration or time width, when permitted to do so by the level detecting circuit 260 of the long time delay tripping circuit 200, the pulse generating circuit 230 is connected to the first and second current circuit means 210 and 220, respectively, and to the conductors P1 and P3 which supply regulated and filtered unidirectional voltages to said pulse generating circuit. More specifically, the pulse generating circuit 230 comprises a breakover device, such as the unijunction transistor or double base diode Q4, the NPN transistor Q7 and the energy storing capacitor C3. It is to be noted that the unidirectional, regulated potential at the conductor P1 may for example be approximately 33 volts which is positive with respect to the potential at the common conductor N1, while the unidirectional, regulated potential at the conductor P3 may be approximately one-half the voltage at the conductor P1 or may be, for example, at a voltage of approximately 16.5 volts which is positive with respect to the potential at the common conductor N1. The lower base of the unijunction transistor Q4 is connected to the common conductor N1 while the upper base of the transistor Q4 is connected to the conductor P3 through the resistor R10 to apply a substantially predetermined interbase potential to the transistor Q4 prior to the breakover of the transistor Q4. The emitter of the transistor Q4 is connected to the left side of the capacitor C3 at the terminal 272 which in turn, is connected to the first current circuit means 210 at the collector of the transistor Q5. The right side of the capacitor C3 at the terminal 282 is connected to the conductor P1 through the resistor R11 and to the base of the transistor Q7 through the diode D28. The base of the transistor Q7 is connected to the common conductor N1 through the resistor R12 which acts as a shunt resistor which is electrically connected in parallel with the base-emitter circuit of the transistor Q7 to decrease the sensitivity of the transistor Q7 and to establish the minimum current in the base-emitter circuit of the transistor Q7 necessary to actuate the transistor Q7 to substantially a saturated condition. The emitter of the transistor Q7 is connected to the common conductor N1, while the collector of the transistor Q7 is connected to the collector of the transistor Q6 which forms part of the second current circuit means 220 and is also connected to the upper side of the timing or integrating capacitor C4 through the diode 30.

In general, the pulse generating circuit 230 operates as a relaxation oscillator or sawtooth voltage generator which depends upon the operating characteristics of the breakover device which is employed as part of the circuit and which is illustrated as the unijunction transistor Q4. The typical operating characteristics of a suitable breakover device such as the unijunction transistor Q4, a four-layer diode, a transistor breakover circuit or other suitable circuit are such that when the voltage or potential applied between the emitter and the lower base of the transistor Q4 exceeds substantially a predetermined fraction or percentage of the potential applied between the upper base and lower base of the transistor Q4, which may be referred to as the peak point voltage, the resistance or impedance between the emitter and the lower base of the transistor Q4 will decrease suddenly until the voltage between the emitter and the lower base of the transistor Q4 decreases to a lower voltage which may be referred to as the valley voltage of the transistor Q4.

More specifically, in considering the detailed operation of the pulse generating circuit 230, it will be assumed initially that the voltage or potential applied between the emitter and the lower base of the transistor Q4 is less than the peak point voltage necessary to cause the transistor to break over and that the transistor Q7 is being held in a substantially saturated condition by the base drive current which flows from the positive conductor P1 through the resistor R11, the forward connected diode D28 and the base-emitter circuit of the transistor Q7 to the common conductor N1. It is to be noted that during the assumed initial operating conditions, the right side of the capacitor C3 at the terminal 282 will be held or clamped at a positive potential with respect to the common conductor N1 which is equal to the sum of the forward voltage drops across the diode D28 and the base-emitter circuit of the transistor Q7. It is also to be noted that the unidirectional output current of the second current circuit means 220 at the collector of the transistor Q6 which is maintained at a substantially predetermined or constant value for a particular value of the highest unidirectional voltage across the resistors R1, R2 and R3 will be diverted away from or bypassed around the timing or integrating capacitor C4 through the collector-emitter path of the transistor Q7 to the common conductor N1, as long as the diode D28 is forward biased and the transistor Q7 is held in a saturated condition.

In the operation of the pulse generating circuit 230, assuming that the highest unidirectional voltage across the resistors R1, R2 and R3 which is directly proportional to the highest line current flowing in the conductors L1, L2 and L3 remains at a particular value, the unidirectional output current from the first current circuit means 210 which appears at the collector of the transistor Q5 will be maintained at a substantially predetermined or constant value and will be applied to the left side of the energy storing capacitor C3 at the terminal 272 to gradually charge the capacitor C3 in a substantially linear manner until the voltage at the terminal 272 exceeds the peak point voltage of the transistor Q4 and the transistor Q4 breaks over and the voltage at the terminal 272 suddenly decreases from the peak point voltage to the valley voltage of the transistor Q4. For example, the potential or voltage at the terminal 272 may decrease suddenly from a peak point voltage of approximately 10 volts which is positive with respect to the common conductor N1 to a valley voltage of approximately 3 volts which is positive with respect to the common conductor N1 when the transistor Q4 breaks over during the charging of the capacitor C3. It is to be noted that prior to the breakover of the transistor Q4, the voltage across the capacitor C3 will increase due to the charging current from the first current circuit means 210 to approximately the voltage at the terminal 272 which may for example be approximately 10 volts which is positive with respect to the common conductor N1 less the two forward voltage drops across the diode D28 and the base-emitter circuit of the transistor Q7 or the voltage across the capacitor C3 may be approximately 9.4 volts prior to the breakover of the transistor Q4. When the transistor Q4 breaks over and the voltage at the terminal 272 suddenly decreases to the valley voltage of the transistor Q4, the voltage at the terminal 282 at the right side of the capacitor C3 will change correspondingly in a negative direction since there is no low resistance discharge path provided for the capacitor C3 which will permit the voltage across the capacitor to change instantaneously in accordance with the change in voltage at the terminal 272. The voltage at the terminal 282 will for example change in a negative direction because of the change in voltage at the terminal 272 to a value which is equal for example to a voltage of 3 volts which is positive with respect to the common conductor N1 less 9.4 volts which is the approximate voltage across the capacitor C3, for example, giving a voltage which is approximately equal to 6.4 volts which is instantaneously negative with respect to the common conductor N1. The diode D28 will then be reverse biased or blocked and the transistor Q7 will be actuated to substantially a nonconducting or cutoff condition.

When the voltage at the right side of the capacitor C3 at the terminal 282 changes in a negative direction to a voltage value which is negative with respect to the voltage at the common conductor N1, the right side of the capacitor C3 will then be charged from the positive conductor P1 through the resistor R11 with the charging current flowing through the emitter and the lower base of the transistor Q4 to the common conductor N1 of the power supply input circuit 100. The voltage at the terminal 282 will gradually increase in a positive direction until the diode D28 is forward biased and the current in the base-emitter circuit of the transistor Q7 actuates the transistor Q7 to a saturated condition. It is to be noted that the transistor Q4 will be held in a substantially conducting condition in the circuit which includes the emitter and the lower base of the transistor Q4 by the charging current which flows from the positive conductor P1 to the right side of the capacitor C3 until the diode D28 becomes forward biased and the transistor Q7 is actuated to a saturated condition. When the transistor Q4 is no longer held in a substantially conducting condition in the emitter-lower base circuit, the transistor Q4 will then be reset to a substantially nonconducting condition in the circuit which includes the emitter and the lower base of the transistor Q4. The current from the collector of the transistor Q5 of the first current circuit means 210 is not sufficient to maintain the transistor Q4 in a substantially conducting condition by itself because of the resistor R9 which is connected in series with the emitter of the transistor Q5. The time interval required to charge the right side of the capacitor C3 at the terminal 282 following the breakover of the transistor Q4 sufficiently to forward bias the diode D28 and to actuate the transistor Q7 to a saturated condition is determined by the time constant of the resistor-capacitor combination which includes the capacitor C3 and the resistor R11 when charged from the positive conductor P1 as explained in greater detail in copending application Ser. No. 765,584 previously mentioned.

When the transistor Q7 is rendered substantially nonconducting or cutoff following the breakover of the transistor Q4 and remains substantially nonconducting for a time interval as just indicated, the unidirectional output current at the collector of the transistor Q6 of the second current circuit means 220 is diverted from the collector-emitter path of the transistor Q7 to a current path which includes the diode D30 and will be applied to charge the timing or integrating capacitor C4 when permitted to do so by the operation of the level detecting means 260, as will be explained hereinafter. The magnitude or amplitude of the pulses of output current which are periodically available from the collector of the transistor Q6 to charge the capacitor C4 when permitted to do so will vary in a substantially linear manner with the highest of the unidirectional voltages across the resistors R1, R2 and R3 and, in turn, with the highest of the line currents which flow in the conductors L1, L2 and L3, respectively. Since the time required to charge the capacitor C3 and periodically break over the transistor Q4 will also vary in a substantially linear manner and be directly proportional to the unidirectional output current of the first current circuit means 210 at the collector of the transistor Q5, which varies with the highest unidirectional voltage across the resistors R1, R2 and R3, the frequency or repetition rate of the pulses of output current at the collector of the transistor Q6 would also vary in a substantially linear manner with the highest of the unidirectional voltages across said resistors and, in turn, with the highest line current which flows in the conductors L1, L2 and L3.

It is to be noted that the periodic pulses of output current which are applied from the collector of the transistor Q6 to the current path which includes the diodes D30 occur at the end of each sawtooth voltage waveform which is produced or generated by the pulse generating circuit 230 and that the duration of the pulses is determined by the time required to charge the right side of the capacitor C3 at the terminal 282 from the regulated voltage at the positive conductor P1 through the resistor R11. The duration or time width of the periodic output pulses of current from the pulse generating circuit 230 will therefore remain substantially constant or at a predetermined value since the width will be substantially independent of variations in the highest line current which flows in the conductors L1, L2 and L3 and the corresponding unidirectional voltages across the resistors R1, R2 and R3, respectively. When the pulse generating circuit 230 is permitted to charge the timing or integrating capacitor C4 by the operation of the level detecting circuit 260, as will be explained hereinafter, the voltage across the capacitor C4 will vary in a substantially linear manner with both the frequency and the magnitude or amplitude of the pulses of output current which flow from the collector of the transistor Q6 through the diode D30 as just described and therefore the voltage across the capacitor C4 will vary substantially with the square of the highest unidirectional voltage across the resistors R1, R2 and R3 and, in turn, with the square of the highest line current flowing in the conductors L1, L2 and L3.

In general, the level detecting circuit 260 of the long time delay tripping circuit 200 is connected to the first auctioneering circuit 110 and to the timing or integrating capacitor C4 to respond to the highest instantaneous voltage across the resistors R1, R2 and R3 and, in turn, to the highest line current flowing in the conductors L1, L2 and L3 to permit the pulse generating circuit 230 to start charging the timing capacitor C4 when the highest instantaneous line current in said conductors exceeds a predetermined value as described in greater detail and claimed in copending application Ser. No. 765,582 filed concurrently with this application by J. D. Watson and assigned to the same assignee as the present application. The level detecting circuit 260 includes the PNP transistors Q8 and Q9 which are connected to control the conducting state of a control means 270 which comprises a PNP transistor Q10 which is connected to normally divert the output pulses of current from the pulse generating circuit 230 away from the timing capacitor C4 to the common conductor N1.

More specifically, the input circuit of the level detecting circuit 260 comprises a voltage dividing network which includes the rheostat or variable resistance means R39, the resistor R14 and the resistor R15 which are connected in series with one another, the series circuit being connected between the variable voltage output conductor V1 of the first auctioneering circuit 110 and the positive conductor P3 which provides one of the regulated unidirectional output voltages from the power supply input circuit 100. It is important to note that the unidirectional voltage at the variable voltage conductor V1 varies instantaneously with the highest of the unidirectional voltages across the resistors R1, R2 and R3 since the voltage at the conductor V1 is not filtered by the capacitor C1 as is the output voltage at the variable voltage conductor V2. The base of the transistor Q8 is connected to the junction point between the resistors R14 and R15, while the emitter of the transistor Q8 is connected to the positive conductor P1. The diode D29 is connected between the base and the emitter of the transistor Q8 to limit the inverse voltage which is applied between the emitter and the base of the transistor Q8 when the transistor Q8 is substantially nonconducting or cutoff and to prevent the base-emitter circuit of the transistor Q8 from breaking down under the inverse voltage which might otherwise be applied to the base-emitter circuit of the transistor Q8. The collector of the transistor Q8 is connected to the common conductor N1 through the collector load resistor R16. The transistor Q9 is directly coupled to the output of the transistor Q8 since the base of the transistor Q9 is connected to the collector of the transistor Q8, while the emitter of the transistor Q9 is directly connected to the positive conductor P1. The collector of the transistor Q9 is connected to the common conductor N1 through the collector load resistor R17. The capacitor C5 is connected between the emitter and the collector of the transistor Q9 to cooperate with the resistor R17 to delay the resetting of the level detecting circuit 260, as will be explained hereinafter. The transistor Q10 which comprises the control means 270 is directly coupled to the transistor Q9 with the collector of the transistor Q9 being connected to the base of the transistor Q10. The collector of the transistor Q10 is connected to the common conductor N1, while the emitter of the transistor Q10 is connected to the positive conductor P3 through a series circuit which includes the forward connected diode D35, the forward connected diode D46, the resistor R35 of the output circuit 400 and the forward connected diode D45 of the output circuit 400. The resistor R18 is connected between the base and the emitter of the transistor Q10 to decrease the sensitivity of operation of the transistor Q10 and to establish the minimum emitter-base current necessary to actuate the transistor Q10 to a saturated condition.

In the operation of the level detecting circuit 260, when the highest instantaneous line current flowing in the conductors L1, L2 and L3 is less than substantially a predetermined value and the corresponding highest instantaneous unidirectional voltage across the resistors R1, R2 and R3 is less than a substantially predetermined voltage, the transistor Q8 of the level detecting circuit 260 is actuated to substantially a saturated condition since the emitter-base circuit of the transistor Q8 is forward biased and a base drive current flows from the positive conductor P1 through the emitter-base circuit of the transistor Q8 and the resistor R15 to the positive conductor P3. When the transistor Q8 is in the normally saturated condition, the voltage drop across the resistor R15 due to the current which flows in the rheostat R39 and the resistor R14 and the current which flows in the emitter-base circuit of the transistor Q8 is equal to the voltage difference between the conductors P1 and P3 less the forward voltage drop across the emitter-base circuit of the transistor Q8. For example, if the unidirectional voltage at the conductor P1 is 33 volts positive with respect to the common conductor N1 and the voltage at the conductor P3 is 16.5 volts positive with respect to the common conductor N1, the voltage across the resistor R15 will be 16.5 volts less the forward voltage drop across the emitter-base circuit of the transistor Q8 or approximately 16 volts. In other words, when the transistor Q8 is in a normally saturated condition, the voltage at the base of the transistor Q8 will differ from the voltage at the positive conductor P1 only by the forward voltage drop of the emitter-base circuit of the transistor Q8. The sum of the instantaneous voltage drops across the rheostat R39 and the resistor R14 will be substantially equal to the highest of the unidirectional voltages across the resistors R1, R2 and R3 since the forward voltage drop across one of the diodes D17, D18 or D19 will substantially compensate for the forward voltage drop across the emitter-base circuit of the transistor Q8 and will assist in temperature compensating for the variations which may occur in the forward voltage drop across the emitter-base circuit of the transistor Q8 due to any changes in the environmental temperature. Since the sum of the voltage drops across the rheostat R39 and the resistor R14 is substantially equal to the highest of the unidirectional voltages across the resistors R1, R2 and R3, the current flowing through rheostat R39 and the resistor R14 will be equal to the highest unidirectional voltage across the resistors R1, R2 and R3 divided by the sum of the resistances of the rheostat R39 and the resistor R14.

As the highest unidirectional voltage across the resistors R1, R2 and R3 increases prior to reaching the predetermined voltage previously mentioned, the current which flows through the rheostat R39 and the resistor R14 increases while the current which flows through the emitter-base circuit of the transistor Q8 decreases. This is because the voltage across the resistor R15 is constrained to be equal to the voltage difference between the conductors P1 and P3 less the forward voltage drop across the emitter-base circuit of the transistor Q8 as long as said transistor remains in a saturated condition, as previously explained.

As long as the transistor Q8 remains in a saturated condition, the current which flows in the resistor R16 will be diverted to the emitter-collector circuit of the transistor Q8 and maintain the transistor Q9 in a substantially nonconducting or cutoff condition. As long as the transistor Q9 is maintained in a substantially nonconducting or cutoff condition, the current flow through the emitter-collector circuit of the transistor Q9 will be substantially negligible and the voltage drop across the resistor R17 will be relatively low. The voltage at the base of the transistor Q10 will therefore be at a value which is relatively close to the voltage at the common conductor N1 and a base drive current will flow from the positive conductor P3 through the series circuit which includes the diode D45, the resistor R35, the diode D46, the diode D35, the emitter-base circuit of the transistor Q10 and the resistor R17 to the common conductor N1. The transistor Q10 will therefore be normally maintained in substantially a saturated condition to thereby provide a low resistance current path from the upper side of the timing or integrating capacitor C4 through the forward connected diode D31, the forward connected diode D35 and the emitter-collector circuit of the transistor Q10 to the common conductor N1 to thereby prevent the output pulses of current from the pulse generating circuit 230 from cumulatively charging the timing capacitor C4.

It is to be noted that in the normal operating condition of the level detecting circuit 260, as long as the highest instantaneous line current flowing in the conductors L1, L2 and L3 remains below a predetermined or threshold value and the corresponding highest instantaneous unidirectional voltage across the resistors R1, R2 and R3 remains below a corresponding predetermined or threshold value, the transistor Q9 will remain in the substantially nonconducting or cutoff condition and the capacitor C5 will charge to a voltage which is substantially equal to the voltage difference between the positive conductor P1 and the common conductor N1 less a relatively small voltage drop across the resistor R17.

When the highest line current flowing in the conductors L1, L2 and L3 exceeds or increases to a value above the predetermined value to which the level detecting circuit 260 is adjusted to respond by the setting of the rheostat R39, and the highest unidirectional instantaneous voltage across the resistors R1, R2 and R3 exceeds a corresponding predetermined voltage value, the current through the rheostat R39 and the resistor R14 increases while the transistor Q8 is still in a saturated condition until the current in the emitter-base circuit of the transistor Q8 decreases to a negligible value and the transistor Q8 is actuated to a substantially nonconducting or cutoff condition. When the transistor Q8 is actuated to a substantially nonconducting condition, the current in the emitter-collector path of the transistor Q8 decreases to a substantially negligible value and the current which flows in the resistor R16 now flows from the positive conductor P1 through the emitter-base circuit of the transistor Q9. The transistor Q9 then carries saturated current in the emitter-collector circuit of the transistor Q9 to increase the voltage drop across the resistor R17 with the voltage at the base of the transistor Q10 which is connected to the upper end of the resistor R17 increasing to a value which is substantially equal to the voltage at the emitter of the transistor Q10 to thereby remove the forward bias of the emitter-base circuit of the transistor Q10 and to actuate the transistor Q10 to a substantially nonconducting or cutoff condition. When the transistor Q10 which forms the control means 270 is actuated to a substantially nonconducting condition, the low resistance path between the upper side of the timing capacitor C4 and the common conductor N1 through the diodes D31 and D35 is operatively removed and the timing capacitor C4 is then permitted to accumulate a charge from the output of the pulse generating circuit 230 with the voltage across the timing capacitor C4 increasing in accordance with substantially the square of the highest unidirectional voltage across the resistors R1, R2 and R3 and, in turn, with substantially the square of the highest line current flowing in the line conductors L1, L2 and L3.

When the transistor Q9 is actuated to a substantially saturated condition in response to a predetermined overload current flowing in one of the conductors L1, L2 and L3, the capacitor C5 which was previously charged up to a voltage equal to the difference in voltage between the conductors P1 and N1 less the voltage drop across the resistor R17 will rapidly discharge through the emitter-collector path of the transistor Q9 until the capacitor C5 is substantially completely discharged. If the highest current flowing in the line conductors L1, L2 and L3 and the corresponding highest unidirectional voltage across the resistors R1, R2 and R3 should instantaneously decrease to a value below the predetermined or threshold value after the level detecting circuit 260 has operated to actuate the transistor Q10 to a substantially nonconducting condition, the transistor Q8 will be restored substantially instantaneously to a saturated condition and the transistor Q9 will be returned substantially instantaneously to a substantially nonconducting condition. Since the sum of the voltage drops across the capacitor C5 and the resistor R17 is equal to the voltage difference between the conductors P1 and N1, the voltage across the capacitor C5 following its discharge by the actuating of the transistor Q9 to a substantially saturated condition and the subsequent return of the transistor Q9 to a substantially nonconducting condition, as just indicated, will increase relatively slowly after the transistor Q9 is restored to a substantially nonconducting condition due to the presence of the resistor R17 in the charging path of the capacitor C5. The charging current which flows to the capacitor C5 from the conductor P1 after the transistor Q9 is returned to a substantially nonconducting condition will produce a gradually decreasing voltage drop across the resistor R17 which is sufficient to maintain the transistor Q10 in a substantially nonconducting condition for a predetermined time delay after the highest instantaneous unidirectional voltage across the resistors R1, R2 and R3 decreases below the predetermined value necessary to actuate the level detecting circuit 260. In other words, if the highest instantaneous line current flowing in the conductors L1, L2 and L3 should exceed a predetermined overcurrent value and then instantaneously decrease below the predetermined instantaneous value, the transistor Q10 will be maintained in a substantially nonconducting condition by the timing circuit which includes the capacitor C5 and the resistor R17 which will delay the resetting of the level detecting circuit 260 for a predetermined time delay following the decrease of the highest instantaneous current below the predetermined value. The time delay may, for example, be slightly longer than the time duration of one-half cycle of the alternating current which flows in the conductors L1, L2 and L3.

If the highest of the instantaneous line currents which flow in the conductors L1, L2 and L3 should exceed the predetermined overload current to which the level detecting circuit 260 is adjusted to respond and then instantaneously decrease for a period of time less than the time delay for which the level detecting circuit 260 is set, the transistor Q10 will be maintained in a substantially nonconducting condition to permit the timing capacitor C4 to continue accumulating charge from the output pulses of current from the pulse generating circuit 230 but if the time interval between successive periods of instantaneous overcurrent should exceed the time delay period for which the level detecting circuit 260 is set, the transistor Q10 will be restored to a substantially saturated condition and rapidly reset the timing capacitor C4 by discharging the capacitor C4 through the circuit which includes the diodes D31 and D35 and the emitter-collector circuit of the transistor Q10 to thereby reset the timing capacitor C4 so that the time delay provided by the overall long time delay tripping circuit 200 would have to again start from an initial operating point on the timing capacitor C4 assuming that the capacitor C4 is reset before the charge and the voltage corresponding to the charge is not sufficient to actuate the operation of the output circuit 400, as will be explained hereinafter.

In summary, the level detecting circuit 260, as described in greater detail in the copending application previously mentioned, provides a relatively fast resetting time since the level detecting circuit responds to the instantaneous value of the highest unidirectional voltage across the resistors R1, R2 and R3 and, in turn, to the highest instantaneous line current flowing in the conductors L1, L2 and L3 and resets the timing capacitor C4 if the time interval between successive instantaneous periods of overcurrent above the predetermined value for which the level detecting circuit 260 is adjusted to respond is longer than the predetermined time period which may, for example, be slightly longer than one-half cycle of the alternating current flowing in the conductors L1, L2 and L3 for which the level detecting circuit 260 is set by the values of the timing circuit which includes the capacitor C5 and the resistor R17. It is to be noted that the predetermined overcurrent level to which the level detecting circuit 260 responds is normally relatively lower than the instantaneous overload current to which the instantaneous tripping circuit 300 responds, as will be described hereinafter. It is also to be noted that when the transistor Q10 which forms the control means 270 is in a substantially saturated condition, the diode D31 is forward biased and the output pulses of current from the pulse generating circuit 230 which flow from the collector of the transistor Q6 will flow to the common conductor N1 through a current path which extends from the collector of the transistor Q6 through the diodes D30 and D31, the diode D35 and the emitter-collector path of the transistor Q10. Whenever the transistor Q10 is actuated to a substantially nonconducting condition, the voltage applied at the cathode of the diode D31 from the positive conductor P3 to the diode D45, the resistor R35 and the diode D46 will be sufficient to reverse bias the diode D31 and permit the timing capacitor C4 to accumulate charge from the output pulses of current from the pulse generating circuit 230 which flow from the collector of the transistor Q6 through the diode D30 to the upper side of the ting capacitor C4.

In the overall operation of the long time delay tripping circuit 200, when the capacitor C4 is permitted to charge from the output pulses of current from the pulse generating circuit 230, the voltage across the capacitor C4 increases in discrete steps until the voltage at the upper side of the capacitor C4 is sufficiently positive to forward bias the diode D31. When the diode D31 is forward biased by the voltage at the upper side of the capacitor C4 increasing to a predetermined or threshold value, the output pulses of current from the collector of the transistor Q6 are applied through the diodes D30 and D31 to the output circuit 400, as will be explained hereinafter, to actuate the operation of the output circuit 400 to thereby energize the trip coil 36 of the circuit breaker CB and to actuate the opening of said circuit breaker. Since the average charging current applied to the timing capacitor C4 from the pulse generating circuit 230 when the pulse generating circuit 230 is permitted to charge the capacitor C4 is substantially proportional to the square of the highest of the undirectional voltages across the resistors R1, R2 and R3 and, in turn, to the highest line current flowing in the conductors L1, L2 and L3, the time delay required to charge the capacitor C4 to substantially a predetermined or threshold voltage sufficient to actuate the output circuit 400 varies substantially inversely with the square of the highest line current which flows in the conductors L1, L2 and L3.

In order to limit the necessary size or value of the timing capacitor C4 to a practical value which is sufficient to provide the time delay required for different values of overload currents, the magnitude of the output undirectional current pulses from the transistor Q6 is limited to a certain range of current values. Under certain operating conditions such as relatively low or overload currents, the undirectional output pulses of current at the collector of the transistor Q6 which are applied through the diodes D30 and D31 when the voltage across the capacitor C4 reaches the predetermined or threshold value necessary, may not be sufficient to actuate the operation of the output circuit 400. In order to increase the sensitivity of the long time delay tripping circuit 200 and to insure that the output pulses of current applied from the long time delay tripping circuit 200 to actuate the output circuit 400 are sufficient for all operating conditions required in a particular application, the auxiliary pulse generating circuit 240 is connected to the pulse generating circuit 230 to periodically increase the voltage available at the upper side of the timing capacitor C4. More specifically, the auxiliary pulse generating circuit 240 is provided to periodically increase the voltage between the lower side of the timing capacitor C4 and the common conductor N1.

The auxiliary pulse generating circuit 240 comprises a NPN transistor Q3 whose base is connected to the positive conductor P1 through the resistor R7 and is coupled to the upper base of the unijunction transistor Q4 of the pulse generating circuit 230 by the capacitor C2. The emitter of the transistor Q3 is connected to the common conductor N1, while the collector of the transistor Q3 is connected to the positive conductor P1 through the collector load resistor R8 and also to the lower side of the timing capacitor C4. It is to be noted that the diode D34 is connected between the lower side of the timing capacitor C4 and the common conductor N1 to complete the discharge path of the timing capacitor C4 during the actuation of the output circuit 400 by the long time delay tripping circuit 200. The diode D32, which may comprise one or more diodes as required in a particular application, is connected between the collector of the transistor Q3 and the common conductor N1 to limit the magnitude of the output pulses of voltage from the auxiliary pulse generating circuit 240 to the forward voltage drop of the diode D32.

In the operation of the auxiliary pulse generating circuit 240, the transistor Q3 is normally maintained in a substantially saturated condition by the base drive current which flows from the positive conductor P1 through the resistor R7 and the base-emitter circuit of the transistor Q3 to the common conductor N1. When the transistor Q3 is in a substantially saturated condition, the lower side of the timing capacitor C4 is at substantially the same potential as the common conductor N1 since the voltage drop across the collector-emitter circuit of the transistor Q3 is substantially negligible when the transistor Q3 is in a substantially saturated condition. When, however, the unijunction transistor Q4 of the pulse generating circuit 230 periodically breaks over during the operation of the pulse generating circuit 230, a negative voltage pulse is produced at the upper base of the transistor Q4 each time that the transistor Q4 breaks over and this negative voltage pulse is transmitted or coupled to the base of the transistor Q3 through the capacitor C2 to thereby actuate the transistor Q3 to a substantially nonconducting condition. When the transistor Q3 is periodically actuated to a substantially nonconducting condition by the operation of the pulse generating circuit 230, the voltage at the collector of the transistor Q3 increases in a positive direction and raises the voltage at the lower side of the timing capacitor C4 by an amount equal to the forward voltage drop of the diode D32.

In the overall operation of the long time delay tripping circuit, as the charge on the timing capacitor C4 approaches the predetermined or threshold value necessary to forward bias the diode D31, the auxiliary or supplementary periodic output voltage pulses applied at the lower side of the capacitor C4 effectively increases the voltage at the upper side of the capacitor C4 with respect to the common conductor N1 and permits the output pulses of current from the collector of the transistor Q6 to be applied through the diode D31 when the total voltage effective at the upper side of the capacitor C4 reaches the predetermined or threshold value necessary to actuate the output circuit 400. The operation of the output circuit 400 is thus assured over the entire range of overload current to which the long time delay tripping circuit 200 responds. It is ot be noted that the diode D27 is connected between the base and the emitter of the transistor Q3 for the purpose of limiting the voltage at the left side of the capacitor C2 when the transistor Q3 is periodically actuated to a nonconducting condition to thereby assist in controlling the width of the output pulses at the collector of the transistor Q3 and protecting the base-emitter circuit of the transistor Q3 from excessive reverse bias voltages.

OUTPUT CIRCUIT 400

In general, the output circuit 400 of the protective device shown in FIG. 1 is connected to the long time delay tripping circuit 200 to respond to substantially a predetermined charge or voltage on the capacitor C4 which corresponds to a predetermined or threshold voltage across said capacitor to actuate the energization of the trip coil 36 of the circuit breaker CB following a predetermined time delay after the operation of the level detecting circuit 260 permits the timing capacitor C4 to start accumulating the necessary charge. More specifically, the output circuit 400 comprises an output level detecting circuit 410 which is connected to the timing capacitor C4 through the diode D31, the semiconductor switching device Q17 whose operation is actuated by the output level detecting circuit 410 and the auxiliary potential source 420 which is provided to maintain certain operating potentials during certain operating conditions, as will be explained hereinafter.

The output level detecting circuit 410 is of the breakover type in that once the operation of the output level detecting circuit 410 is initiated, the operation of said circuit continues or proceeds by regenerative action until the operation of said circuit is completed. The output level detecting circuit 410 comprises the PNP transistor Q15 and the NPN transistor Q16. The emitter of the transistor Q15 is connected to the upper side of the timing capacitor C4 through the diode D31, while the base of the transistor Q15 is connected to the positive conductor P3 through the resistor R35 and the forward connected diode D45. The collector of the transistor Q15 is connected to the base of the transistor Q16 through the diode D47 and also to the control means 150 of the power supply input circuit 100 through the isolating diode D48 in order to prevent the operation of the output circuit 400 in the event that the energy storing capacitor C13 of the power supply input circuit 100 is not fully charged, as previously explained. As shown in FIG. 2, the collector of the transistor Q16 is connected to the base of the transistor Q15, while the emitter of the transistor Q16 is connected to the common conductor N1 through the resistor R34 and also to the gate electrode of the silicon controlled rectifier or semiconductor switching device Q17. The resistor R33 is connected between the emitter and the base of the transistor Q15 in order to normally maintain the potential at the emitter of the transistor Q15 at substantially the same potential as at the base of the transistor Q15. In order to protect the emitter-base circuit of the transistor Q15 from excess reverse bias during certain operating conditions, the diode D46 is connected between the emitter and the base of the transistor Q15 to limit the revrese voltage across the emitter-base circuit of the transistor Q15 to the forward voltage drop of the diode D46. The capacitor C11 is connected between the emitter and the base of the transistor Q15 to provide some degree of noise suppression in the operation of the output level detecting circuit 410 by bypassing transient voltage surges which may occur in the overall operation of the protective device shown in FIG. 1 around the emitter-base circuit of the transistor Q15. The resistor R32 is connected between the base of the transistor Q16 and the common conductor N1 to provide a shunt path around the base-emitter circuit of the transistor Q16 for the leakage current which might flow at relatively high environmental temperatures from the collector to the base of the transistor Q16. The resistor R32 prevents this leakage current from flowing from the base to the emitter of the transistor Q16 and being amplified by the current gain of the transistor Q16 which might cause improper tripping operations due to the gating of the silicon controlled rectifier Q17. The resistor R32 also determines the amount of current at the emitter of the transistor Q15 which is necessary to actuate the operation of the output level detecting circuit 410.

The auxiliary potential source 420 is connected to the output level detecting circuit 410 to temporarily maintain the voltage at the base of the transistor Q15 whenever the overall protective device shown in FIG. 1 is deenergized sufficiently long enough to prevent an improper operation of the output level detecting circuit when the voltages at the positive conductors P1, P2 and P3 collapse at a relatively fast rate and the voltage on the timing capacitor C4 might be sufficient to actuate the operation of the outpu level detecting circuit 410 and to cause an improper tripping operation of the circuit breaker CB. The auxiliary potential source 420 comprises the diode D45 which is connected between the positive conductor P3 and the right end of the resistor R35, the capacitor C12 which is connected between the junction point of the resistor R35 and the diode D45 and the common conductor N1, and the resistor R36 which is connected between the upper side of the capacitor C12 and the common conductor N1. It is to be noted that the resistor R36 provides a relatively slow discharge path for the capacitor C12 after the overall protective device shown in FIG. 1 has deenergized for a certain time period and the auxiliary potential source 420 has performed its intended purpose. It is to be noted that the auxiliary potential source 420 also prevents improper tripping operations in the event that the overall protective device shown in FIG. 1 should be temporarily deenergized due to a temporary loss of power.

In order to energize the trip coil 36 of the circuit breaker CB in response to the operation of the output level detecting circuit 410, the anode of the silicon controlled rectifier or semiconductor switching device Q17 is connected to the positive conductor P1 through the resistor R37, while the cathode of said silicon controlled rectifier is connected to the common conductor N1. The trip coil 36 is electrically connected in parallel with the resistor R37 between the positive conductor P1, which, in turn, is connected to one side of the capacitor C13 of the power supply input circuit 100, and the junction point between the resistor R37 and the anode of the silicon controlled rectifier Q17. More specifically, the trip coil 36 is connected between the terminal 414 as shown in FIG. 1 which, in turn, is connected to the positive conductor P1 and the terminal 422, which is connected, in turn, to the junction point between the resistor R37 and the anode of the silicon controlled rectifier Q17. In order to prevent an improper operation of the silicon controlled rectifier due to transient voltage surges which may occur during the overall operation of the protective device shown in FIG. 1, a noise suppression network which includes the resistor R44 and the capacitor C17 connected in series, is connected between the anode and the cathode of the silicon controlled rectifier Q17 to bypass such transient voltage surges around the silicon controlled rectifier Q17.

In the overall operation of the output circuit 400, when the level detecting circuit 260 of the long time delay tripping circuit 200 permits the timing capacitor C4 to accumulate a charge from the pulse generating circuit 230, the voltage across the timing capacitor C4 increases in discrete steps at a rate which varies substantially with the square of the highest line current which flows in the conductors L1, L2 and L3, as previously explained, until the voltage across the capacitor C4 is sufficient to forward bias the diode D31. When the diode D31 is forward biased by the voltage at the upper side of the timing capacitor C4 which is periodically increased or raised by the auxiliary pulse generating circuit 240, as previously explained, an input current for the output circuit 400 flows from the collector of the transistor Q6 through the diodes D30 and D31 through the emitter-base circuit of the transistor Q15 of the output level detecting circuit 410 to thereby increase the current which flows from the emitter to the collector of the transistor Q15, through the diode D47 and through the base-emitter circuit of the transistor Q16. When the transistor Q16 starts to conduct current in its base-emitter circuit, the current which flows from the collector to the emitter of the transistor Q16 also increases to thereby additionally increase the current flow from the emitter to the base of the transistor Q15. It is to be noted that the current which flows from the collector-emitter path of the transistor Q16 also flows from the positive conductor P3 through the diode D45 and the resistor R35 through the collector-emitter circuit of the transistor Q16 and to the common conductor N1 through the resistor R34 and the gate cathode circuit of the controlled rectifier Q17. The effect of the increase in the collector-emitter current of the transistor Q16 and its consequent effect on the emitter-base current of the transistor Q15 increases until both of the transistors Q15 and Q16 are actuated to substantially a saturated condition. The output current of the output level detecting circuit 410 from the emitter of the transistor Q16 also flows through the gate of the silicon controlled rectifier Q17 into the anode of the silicon controlled rectifier Q17 to thereby actuate said controlled rectifier to a substantially conducting condition. When the silicon controlled rectifier Q17 is actuated to a substantially conducting condition, the trip coil 36 is energized by the current which flows from the positive conductor P1 through the trip coil 36 and through the anode-cathode circuit of the controlled rectifier Q17 to the common conductor N1 to thereby actuate a tripping operation of the circuit breaker CB. It is to be noted that the current which energizes the trip coil 36 flows from the right side of the capacitor C13 of the power supply input circuit 100 through the positive conductor P1, the trip coil 36 and the anode-cathode circuit of the controlled rectifier Q17 to the common conductor N1 and then to the left side of the capacitor C13. It is also to be noted that after the trip coil 36 is energized by the discharge of the capacitor C13 through said trip coil and the controlled rectifier Q17, the resistor R37 which is connected in series with the anode-cathode circuit of the controlled rectifier Q17 provides a circulating path to dissipate the stored energy in the trip coil 36 which normally is an inductive device and thereby limits the inverse voltage applied to the controlled rectifier Q17 to a value within the rating of the controlled rectifier Q17.

In the event that the capacitor C13 is not charged sufficiently to energize the trip coil 36, the control means 150 of the power supply input circuit 100 as previously explained will prevent the operation of the output circuit 400 by providing a relatively low resistance path from the collector of the transistor Q15 through the diode D48 which will then be forward biased and through the collector-emitter circuit of the transistor Q2 of the control means 150 to the common conductor N1.

As previously mentioned, the auxiliary pulse generating circuit 240 is provided to periodically increase the voltage at the lower side of the timing capacitor C4 and in effect at the upper side of said capacitor in order to insure that the input current applied to the output circuit 400 will be sufficient over the entire range of overload currents to which the long time delay tripping circuit 200 is intended to respond.

In summary, the long time delay tripping circuit 200 provides substantially an $I^2t=K$ (where K equals a constant and $t$ equals tripping time) operating characteristic which may be varied in a substantially continuous manner between a minimum time delay characteristic and a maximum time delay characteristic by the adjustment of the rheostat R38 which, in effect, varies the constant to which $I^2t$ is substantially equal over a predetermined operating range of overload currents. As previously explained, if the highest line current flowing in the conductors L1, L2 and L3 exceeds the predetermined or threshold current value to which the level detecting circuit 260 responds, as determined by the setting of the rheostat R39, the timing capacitor C4 will be permitted to start accumulating a charge from the pulse generating circuit 230. If, however, the highest line current flowing in the conductors L1, L2 and L3 then instantaneously decreases to a value less than the predetermined value to which the level detecting circuit 260 responds and remains less than the predetermined value before the time delay provided in the overall operation of the long time delay tripping circuit 200 is completed, the timing capacitor C4 will be reset after a predetermined time interval or delay which may be adjusted or selected to be slightly longer than one-half cycle of the alternating current flowing in the conductors L1, L2 and L3 assuming that the last-mentioned timing interval before reset of the capacitor C4 ends before the voltage across the capacitor C4 is sufficient to actuate the operation of the output level detecting circuit 410. The resetting of the timing capacitor C4 would be accomplished by restoring the control means 270 which comprises the transistor Q10 to a substantially saturated condition which rapidly discharges the timing capacitor C4 at the end of the time interval just mentioned. It is to be noted that the control means 270 is of the emitter-follower type.

INSTANTANEOUS TRIPPING CIRCUIT 300

Referring now to the instantaneous tripping circuit 300 indicated in block form in FIG. 1 and shown in detail in FIG. 2, the instantaneous tripping circuit 300 in general, is connected between the first auctioneering circuit 110 of the power supply input circuit 100 and the level detecting circuit 410 of the output circuit 400 to actuate the energization of the trip coil 36 of the circuit breaker CB when the highest instantaneous line current flowing in the conductors L1, L2 and L3 increases above or exceeds substantially a predetermined or threshold value without any intentional time delay and when the main contacts BC1, BC2 and BC3 of the circuit breaker CB are not closed and latched in.

More specifically the instantaneous tripping circuit 300 as shown in FIG. 2 comprises a PNP transistor Q18 and a voltage dividing network which includes the rheostat R42, the resistor R24 and the resistor R89 which are connected in series with one another between the variable voltage output conductor V1 of the first auctioneering circuit 110 and the positive conductor P3. The emitter of the transistor Q18 is connected to the junction point between the resistors R24 and R89, while the base of the transistor Q18 is connected to the positive conductor P2 in order that the forward voltage drop across the diode D23, which may include one or more forward connected diodes in a particular application, compensate the input voltage of the instantaneous tripping circuit 300 for the forward voltage drop across one of the diodes D17, D18 or D19 of the first auctioneering circuit 110 and for the forward voltage drop across the emitter-base circuit of the transistor Q18 during the operation of the instantaneous tripping circuit 300. The diode D39 is connected between the emitter and the base of the transistor Q18 in order to protect the emitter-base circuit of the transistor Q18 from excessive reverse bias by limiting the maximum reverse voltage applied to the emitter-base circuit of the transistor Q18 to the forward voltage drop of the diode D39. The collector of the transistor Q18 is connected to the common conductor N1 by the collector load resistor R25. The utput of the instantaneous tripping circuit 300 at the collector of the transistor Q18 is connected to the emitter of the transistor Q15 of the output level detecting circuit 410 by the isolating diode D40 whose anode is connected to the collector of the transistor Q18 and whose cathode is connected to the emitter of the transistor Q15. The capacitor C8 is electrically connected in parallel with the resistor R25 between the collector of the transistor Q18 and the common conductor N1 in order to provide a degree of noise suppression in the operation of the instantaneous tripping circuit 300 by diverting the output of the instantaneous tripping circuit 300 to the common conductor N1 when the output is due to transient voltage surges which may occur during the operation of the overall protective device shown in FIG. 1 and also to provide a pulse of discharge current to the output level detecting circuit 410 of the output circuit 400 during the operation of the instantaneous tripping circuit 300 to insure that the transistors Q15 and Q16 are both actuated to substantially saturated conditions and to insure that the controlled rectifier Q17 is actuated to a substantially conducting condition to energize the trip coil 36 during the overall operation of the protective device shown in FIG. 1.

In order to render the instantaneous tripping circuit 300 inoperative to actuate the operation of the output circuit 400 or to prevent the instantaneous tripping circuit 300 from actuating the operation of the output circuit 400 to energize the trip coil 36 after the main contacts BC1, BC2 and BC3 are closed and latched in, the circuit breaker CB includes an auxiliary contact means, as indicated at AC1 in FIGS. 1 and 2, with the auxiliary contact means AC1 being operatively connected to the same operating means which actuates said main contacts, as indicated at 33 in FIG. 1, to close in a sequential manner with respect to the main contacts BC1, BC2 and BC3 or, more specifically, to close a short time after said main contacts are actuated to the closed positions. The auxiliary contact means AC1 is electrically connected between the common conductor N1 and the upper end of the resistor R25 through the terminal 344 as shown in FIG. 2 to divert the output of the instantaneous tripping circuit 300 away from the emitter of the transistor Q15 whenever the main contacts BC1, BC2 and BC3 of the circuit breaker are closed and latched in. In other words, when the circuit breaker CB is open, the separable contacts of the auxiliary contact means AC1 are open and when the main contacts of said circuit breaker are closed and latched in, the separable contacts of the auxiliary contact means AC1 are closed to render the instantaneous tripping circuit 300 inoperative to actuate the output circuit 400 to energize the trip coil 36.

In the operation of the instantaneous tripping circuit 300, it will be assumed initially that the main contacts BC1, BC2 and BC3 of the circuit breaker CB are open and that the separable contacts of the auxiliary contact means AC1 are also open. It is to be noted that the voltage at the base of the transistor Q18 is determined by the regulated, unidirectional potential at the positive conductor P2, since the base of the transistor Q18 is connected to said positive conductor. The voltage at the emitter of the transistor Q18 varies with and is directly proportional to the highest instantaneous unidirectional voltage across the resistors R1, R2 and R3 and, in turn, to the highest instantaneous line current flowing in the conductors L1, L2 and L3. More specifically, the voltage at the emitter of the transistor Q18 is equal to the voltage at the positive conductor P3 plus the voltage drop across the resistor R89 which depends, in part, upon the setting of the rheostat R42. As long as the highest instantaneous line current flowing in the conductors L1, L2 and L3 remains below substantially a predetermined or threshold value, the emitter-base circuit of the transistor Q18 is reverse biased and the transistor Q18 is substantially nonconducting or cutoff. As long as the transistor Q18 is substantially nonconducting or cutoff, the current flow through the resistor R25 and the collector circuit of the transistor Q18 is substantially negligible and the potential at the anode of the diode D40 is relatively close to the potential at the common conductor N1 with the diode D40 being normally reverse biased or blocked due to the potential which is applied to the cathode of the diode D40 from the positive conductor P3 through the diode D45, the resistor R35 and the diode D46.

When the highest instantaneous line current flowing in the conductors L1, L2 and L3 exceed substantially a predetermined or threshold value to which the instantaneous tripping circuit 300 is adjusted to respond by the setting of the rheostat R42 and the corresponding highest instantaneous unidirectional voltage across the resistors R1, R2 and R3 exceeds substantially a corresponding predetermined value, the voltage at the emitter of the transistor Q18 increases in a positive direction sufficiently to forward bias the emitter-base circuit of the transistor Q18 and to actuate the transistor Q18 to a substantially saturated condition. Due to the increased current flow in the emitter-collector circuit of the transistor Q18, the voltage drop across the resistor R25 increases to increase the positive voltage at the anode of the diode D40 to thereby forward bias the diode D40. When the diode D40 is forwarded biased, the output current of the instantaneous tripping circuit 300 from the collector of the transistor Q18 flows through the diode D40 and into the emitter-base circuit of the transistor Q15 of the output level detecting circuit 410 to, in turn, actuate the controlled rectifier Q17 to a substantially conducting condition and to energize the trip coil 36, as previously explained in greater detail in connection with the operation of the long time delay tripping circuit 200. In other words, assuming that the main contacts BC1, BC2 and BC3 of the circuit breaker CB and the auxiliary contact means AC1 are in the open positions, when the highest instantaneous line current flowing in the conductors L1, L2 and L3 exceeds substantially a predetermined or threshold value for which the rheostat R42 of the instantaneous tripping circuit 300 actuates the energization of the trip coil 36 in a substantially instantaneous manner without any intentional time delay. In the operation of the instantaneous tripping circuit 300, it is to be noted that as the highest instantaneous line current in the conductors L1, L2 and L3 increases toward the predetermined value to which the instantaneous tripping circuit 300 responds, the control means 270 which comprises the transistor Q10 and which forms part of the level detecting circuit 260 of the long time delay tripping circuit 200 will be actuated from a normally saturated condition to a substantially nonconducting condition prior to the operation of the instantaneous tripping circuit 300 to thereby eliminate the relatively low resistance path to the common conductor N1 from the emitter of the transistor Q15 of the output level detecting circuit 400 which would otherwise divert the output current of the insantaneous tripping circuit 300 away from the emitter of the transistor Q15.

In the operation of the instantaneous tripping circuit 300, it is to be noted that when the main contacts BC1, BC2 and BC3 of the circuit breaker CB are actuated to the closed position shown in FIG. 1, the auxiliary contact means AC1 will also be actuated to a closed position following the closing of said main contacts after a relatively short time delay to thereby electrically connect the collector of the transistor Q18 of the instantaneous tripping circuit 300 directly to the common conductor N1 to prevent the instantaneous tripping circuit 300 from actuating the operation of the output circuit 400, as just described. In other words, in a protective device as disclosed, the instantaneous tripping circuit 300 will only be effective to actuate the tripping of the circuit breaker CB during the closing of said circuit breaker prior to the time that the main contacts of said circuit breaker are closed and latched in. After said main contacts of the circuit breaker CB are closed and latched in, the auxiliary contact means AC1 will close to inhibit or render the instantaneous tripping circuit 300 inoperative to actuate the output circuit 400 to energize the trip coil 36 of the circuit breaker CB.

It is to be noted that the setting of the rheostat R42 of the instantaneous tripping circuit 300 determines the upper end of he range of overload currents to which the long time delay tripping circuit 200 responds since when the highest instantaneous line current flowing in the conductors L1, L2 and L3 exceeds the predetermined or threshold value to which the instantaneous tripping circuit 300 responds, the trip coil 36 of the circuit breaker CB will be energized substantially instantaneously, as determined by the operating characteristics of the instantaneous tripping circuit 300 without any intentional time delay being introduced prior to the energization of the trip coil 36 assuming that the main contacts of said circuit breaker along with the auxiliary contact means AC1 are open. It is also important to note that the energization of the trip coil 36 in response to both the long time delay tripping circuit 200 and the instantaneous tripping circuit 300 occurs independently, either after a predetermined time delay which varies substantially inversely with the square of the overcurrent in the case of the long time delay tripping circuit 200 or substantially instantaneously in response to the operation of the instantaneous tripping circuit 300 unless the operation of the instantaneous tripping circuit 300 is inhibited or prevented by the operation of the auxiliary contact means AC1 in response to the closing and latching in of the main contacts BC1, BC2 and BC3 of said circuit breaker.

SHORT DELAY TRIPPING CIRCUIT 500

Figure 3:
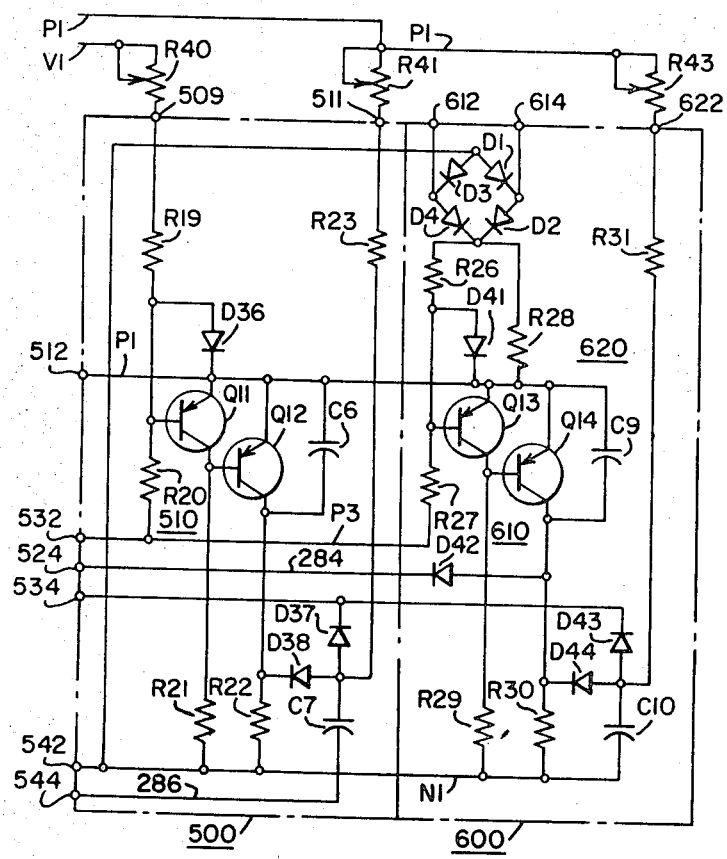
FIG. 3 is a detailed schematic diagram of a different portion of the protective device which is shown in block form in FIG. 1.

Referring now to the short delay tripping circuit 500 which is indicated in block form in FIG. 1 and shown in detail in FIG. 3, the short delay tripping circuit 500 is connected between the first auctioneering circuit 100 and the output circuit 400 to respond to the highest instantaneous line current flowing in the conductors L1, L2 and L3, when the highest instantaneous line current exceeds substantially a predetermined or threshold value to actuate the output circuit 400 to energize the trip coil 36 following a substantially fixed or predetermined time delay which remains at the same predetermined value independently of the magnitude of the highest instantaneous current in excess of the predetermined value. It is to be noted that the short delay tripping circuit 500 may be conveniently employed in combination with the long time delay tripping circuit 200 and the instantaneous tripping circuit 300 and that the short time delay tripping circuit 500 independently actuates the common output circuit 400 to energize the trip coil 36 with the predetermined current to which the short delay tripping circuit 500 responds being coordinated with the range of overload currents to which the long time delay tripping circuit 200 responds and the predetermined instantaneous current to which the instantaneous tripping circuit 300 responds. It is also important to note that when the main contacts of the circuit breaker CB are closed and latched in, the instantaneous tripping circuit 300 is prevented from actuating the operation of the output circuit 400 which is then only responsive to the operation of the long time delay tripping circuit 200 and the short delay tripping circuit 500.

More specifically, the short delay tripping circuit 500 comprises the PNP transistors Q11 and Q12 and a voltage dividing network which includes the resistors R19 and R20 and the rheostat R40 which are connected in series with one another between the variable voltage output conductor V1 of the first auctioneering circuit 110 and the positive conductor P3. The base of the transistor Q11 is connected to the junction point between the resistors R19 and R20, while the emitter of the transistor Q11 is connected to the positive conductor P1. The diode D36 is connected between the base and the emitter of the transistor Q11 to protect the emitter-base circuit of the transistor Q11 from excessive reverse bias by limiting the maximum reverse voltage applied to the emitter-base circuit of the transistor Q11 to the forward voltage drop of the diode D36. The input voltage of the short delay tripping circuit 500 which is the sum of the voltage drops across the rheostat R40 and the resistor R19 is substantially equal to the highest unidirectional voltage across the resistors R1, R2 and R3 and, in turn, is directly proportional to the highest instantaneous line current flowing in the conductors L1, L2 and L3. The forward voltage drop of the emitter-base circuit of the transistor Q11 compensates the input voltage of the short delay tripping circuit 500 for the forward voltage drop across one of the diodes D17, D18 and D19 of the first auctioneering circuit 110. The collector of the transistor Q11 is connected to the base of the transistor Q12 and also to the common conductor N1 through the collector load resistor R21. The emitter of the transistor Q12 is also connected to the positive conductor P1, while the collector of the transistor Q12 is connected to the common conductor N1 through the collector load resistor R22 and through the diode D38 to the upper side of the timing or integrating capacitor C7 of the short delay tripping circuit 500. In order to delay the reset of the short delay tripping circuit 500 following the end of a period of time during which the highest instantaneous line current flowing in the line conductors L1, L2 and L3 exceeded the predetermined value to which the short delay tripping circuit 500 is adjusted to respond by the setting of the rheostat R40, the capacitor C6 is connected between the emitter and the collector of the transistor Q12.

In order to provide a substantially fixed or predetermined time delay between the start of an instantaneous overcurrent which exceeds the predetermined or threshold value and to which the short delay tripping circuit 500 is adjusted to respond, an R-C timing circuit is provided as part of the short delay tripping circuit 500 which includes the rheostat R41, the resistor R23 and the timing capacitor C7 with the rheostat R41 and the resistor R23 being connected in series with one another between the positive conductor P1 and the upper side of the timing capacitor C7. The upper side of the timing capacitor C7 is also connected to the emitter of the transistor Q15 which forms part of the output level detecting circuit 410 of the output circuit 400 through the normally reverse biased or blocked diode D37. The lower side of the timing capacitor C7 of the short delay tripping circuit 500 is connected by the conductor 286 through the terminals 544 and 244 to the output of the auxiliary pulse generating circuit 240 at the collector of the transistor Q3 which forms part of said auxiliary pulse generating circuit in order that the lower side of the capacitor C7 be periodically raised in voltage with respect to the common conductor N1 to thereby periodically raise or increase the effective voltage at the upper side of the capacitor C7.

In the operation of the short delay tripping circuit 500, it is to be noted that the voltage dividing network which includes the rheostat R40 and the resistors R19 and R20 along with the transistors Q11 and Q12 comprises a level detecting circuit 510 having a time delay reset operation of the same type which is disclosed in greater detail in copending application Ser. No. 765,582 filed concurrently herewith by J. D. Watson and assigned to the same assignee as the present application. As long as the highest instantaneous line current flowing in the conductors L1, L2 and L3 remains below or less than substantially a predetermined or threshold value and the corresponding highest instantaneous unidirectional voltage across the resistors R1, R2 and R3 remains below a corresponding predetermined or threshold value, the transistor Q11 will be in a normally saturated condition since the emitter-base circuit of the transistor Q11 will be forward biased with the voltage at the conductor P1 being greater than the voltage at the base of the transistor Q11. The predetermined highest instantaneous current to which the short delay tripping circuit 500 is adjusted to respond is determined by the setting of the rheostat R40.

As long as the highest instantaneous current flowing in the conductors L1, L2 and L3 remains below the predetermined current to which the short delay tripping circuit 500 is adjusted to respond by the setting of the rheostat R40, the transistor Q11 will carry saturated current in the emitter-collector path of the transistor Q11 with the voltage at the base of the transistor Q12 with respect to the common conductor N1 being determined by the voltage drop across the resistor R21 which is due primarily to the collector current of the transistor Q11. When the transistor Q11 is carrying saturated current, the emitter-base circuit of the transistor Q12 will be biased at substantially zero voltage and the transistor Q12 will be in a substantially nonconducting condition. As long as the transistor Q12 is in a substantially nonconducting condition, the voltage drop across the resistor R22 due to the emitter-collector current of the transistor Q12 will be relatively low and the voltage at the cathode of the diode D38 will be relatively close to that at the common conductor N1 with the diode D38 being forward biased to prevent the timing capacitor C7 from accumulating a charge from the positive conductor P1 through the rheostat R41 and the resistor R23. Since the cathode of the diode D37 is normally maintained at a positive voltage with respect to the common or negative conductor N1 through the diode D45, the resistor R35 and the diode D46 from the voltage at the positive conductor P3, the diode D37 will normally be reversed biased or blocked since the voltage at the anode of the diode D37 will be equal to the sum of the forward voltage drop of the diode D38 and the relatively small voltage drop across the resistor R22, as long as the highest instantaneous line current flowing in the conductors L1, L2 and L3 remains below the predetermined value to which the short delay tripping circuit 500 is adjusted to respond by the setting of the rheostat R40. It is to be noted that as long as the transistor Q12 is in a normally substantially nonconducting condition, the capacitor C6 which is connected between the emitter and the collector of the transistor Q12 will be charged up to a voltage which is equal to the difference in voltage between the conductors P1 and N1 less a relatively low voltage drop across the resistor R22.

When the highest instantaneous current flowing in the conductors L1, L2 and L3 exceeds substantially a predetermined or threshold value to which the short delay tripping circuit 500 is adjusted to respond, the current which flows in the voltage dividing network which includes the rheostat R40, the resistor R19 and the resistor R20 will increase until the voltage of the base of the transistor Q11 increases in a positive direction to reverse bias the emitter-base circuit of the transistor Q11 which will then be actuated to a substantially non-conducting condition. When the transistor Q11 is actuated to a substantially nonconducting condition, the current in the emitter-collector path of the transistor Q11 will decrease to a negligible value and the current which flows in the resistor R21 will now flow from the positive conductor P1 through the emitter-base circuit of the transistor Q12. The transistor Q12 which will then be actuated to a substantially saturated condition. When the transistor Q12 is actuated to a substantially saturated condition, the current in the emitter-collector path of the transistor Q12 increases to thereby cause an increased voltage drop across the resistor R22 which will then result in a voltage at the cathode of the diode D38 which is sufficient to reverse bias or block the diode D38 to permit the timing capacitor C7 to start charging from the positive conductor P1 through the rheostat R41 and the resistor R23. Assuming that the overcurrent condition to which the short delay tripping circuit 500 is adjusted to respond continues for substantially a predetermined or fixed time delay which is determined by the setting of the rheostat R41, the resistor R23 and the capacitor C7 along with the regulated voltage at the conductor P1, the voltage at the upper side of the timing capacitor C7 which is periodically increased by the auxiliary voltage pulses from the auxiliary pulse generating circuit 240 which forms part of the long time delay tripping circuit 200 will be sufficient to forward bias the diode D37. When the diode D37 is forward biased, current will flow from the conductor P1 through the rheostat R41 and the resistor R23 to cause a base drive current to flow through the diode D37 into the emitter-base circuit of the transistor Q15 of the output level detecting circuit 410 to actuate the controlled rectifier Q17 to a substantially conducting condition to thereby energize the trip coil 36 of the circuit breaker CB and actuate the circuit breaker CB to an open condition.

It is to be noted that when the transistor Q12 is actuated to a substantially saturated condition in response to the highest instantaneous current which flows in the conductors L1, L2 and L3, the capacitor C6 will rapidly discharge through the emitter-collector path of the transistor Q12. If the highest instantaneous current flowing in the conductors L1, L2 and L3 exceeds the predetermined value to which the short delay tripping circuit 500 is adjusted to respond by the setting of the rheostat R40 and then instantaneously decreases below the predetermined value, the transistor Q11 will be returned substantially instantaneously to a saturated condition and the transistor Q12 will be restored substantially instantaneously to a substantially nonconducting condition. The capacitor C6 will then start to charge from the voltage between the conductors P1 and N1 through the resistor R22. While the capacitor C6 is charging, the voltage across the resistor R22 will gradually decrease until the voltage at the cathode of the diode D38 decreases sufficiently to forward bias said diode to thereby rapidly discharge the timing capacitor C7 if the overall time delay provided by the short delay tripping circuit 500 has not been completed. In other words, after the operation of the short delay tripping circuit 500 has been actuated by the highest instantaneous current flowing in the conductors L1, L2 and L3 and then the highest instantaneous current decreases below the predetermined value necessary to actuate the short delay tripping circuit 500 for a predetermined time period which is determined by the values of the capacitor C6 and the resistor R22 and the voltage between the conductors P1 and N1, the resetting of the short time delay tripping circuit 500 will be delayed for a predetermined time interval which may be slightly longer than one-half cycle of the alternating current flowing in the conductors L1, L2 and L3 similarly to the level detecting 260 of the long time delay tripping circuit 200, as previously described. On the other hand, if the highest instantaneous current flowing in the line conductors L1, L2 and L3 exceeds the substantially predetermined or threshold value to which the short delay tripping circuit 500 is adjusted to respond and then decreases for a period of time less than the time delay provided in the reset of the short delay tripping circuit 500, the timing out or accumulation of charge on the timing capacitor C7 will continue in an uninterrupted fashion. It is to be noted that the substantially predetermined or fixed time delay provided in the overall operation of the short delay tripping circuit 500 is independent of the magnitude of the highest instantaneous line current in the conductors L1, L2 and L3 for values of current in excess of the predetermined value to which the short delay tripping circuit 500 is adjusted to respond by the rheostat R40 and that the time delay may be adjusted by the setting of the rheostat R41.

It is to be noted that the short delay tripping circuit 500 determines by the predetermined instantaneous current to which it is adjusted to respond the upper end of the range of overcurrents to which the long time delay tripping circuit 200 will respond in a particular application since if the highest instantaneous line current flowing in the conductors L1, L2 and L3 exceeds the predetermined value to which the short delay tripping circuit 500 is adjusted to respond, the output circuit 400 will be actuated to energize the trip coil 36 after substantially a predetermined or fixed time delay which is normally shorter than the predetermined time delay provided in the operation of the long time delay tripping circuit 200. It is also to be noted that the reset of the short delay tripping circuit 500 is accomplished by the discharge of the capacitor C7 through the diode D38 and the resistor R22 to the common conductor N1, rather than employing a control means of the emitter-follower type such as the control means 270 which is provided as part of the level detecting circuit 260 of the long time delay tripping circuit 200 as previously described, since the timing capacitor is normally of a lower value than the timing capacitor C4 which forms part of the long time delay tripping circuit 200. In summary, it is important to note that the short delay tripping circuit 500 may be adjusted to respond to the same or higher instantaneous current as that to which the instantaneous tripping circuit 300 responds in a particular application because of the difference in time-current characteristics of the two tripping circuits. For example, the instantaneous tripping circuit 300 which is only operative prior to the closing and latching in of the main contacts BC1, BC2 and BC3 due to the operation of the auxiliary contact means AC1 as previously explained, may be adjusted to respond to a highest instantaneous current value such as 30,000 amperes which is coordinated with the maximum current against which the operating means or mechanism of the circuit breaker CB is capable of closing. On the other hand, once the main contacts BC1, BC2 and BC3 of the circuit breaker CB are closed and latched in, the operating means or mechanism of said circuit breaker may be capable of holding said main contacts in the closed position for at least a relatively short time period at a relatively higher instantaneous current and the short delay tripping circuit 500 may therefore be adjusted to respond to a relatively higher current than the instantaneous tripping circuit 300 such as 39,000 amperes to permit the application of the circuit breaker CB in a power system having a relatively higher fault current capacity than the current against which the circuit breaker is capable of closing. Since the protective device in the disclosed arrangement is capable of discriminating between the open and closed positions of the circuit breaker CB, the operating characteristics of the protective device as just indicated may be adjusted or modified between the open and closed positions of said circuit breaker to coordinate with the closing capabilities of said circuit breaker.

GROUND CURRENT TRIPPING CIRCUIT 600

Referring now to the ground current tripping circuit 600 which is indicated in block form in FIG. 1 and shown in detail in FIG. 3, the ground current tripping circuit 600, in general, is connected between the ground current transformer T4 and the output circuit 400 to actuate the output circuit 400 to energize the trip coil 36 of the circuit breaker CB when the ground current, as sensed by the transformer T4, increases above or exceeds substantially a predetermined value or level. More specifically, the primary winding of the ground current transformer T4 is connected between the neutral conductor NT1 of the current transformers CT1, CT2 and CT3 and the neutral conductor NT2 of the interposing transformers T1, T2 and T3. The terminal 42 at the upper end of the primary winding of the transformer T4 may be connected to the ground conductor (not shown) of the electrical system which includes the conductors L1, L2 and L3 and which is to be provided with ground current protection where desired in a particular application. The output ground current from the transformer T4 which is available at the conductors G12 and G13 is applied at the input terminals 612 and 614, respectively, of a full wave bridge type rectifier which includes the diodes D1, D2, D3 and D4 to obtain a unidirectional current output which is directly proportional to and varies in a substantially linear manner with the ground current in the electrical system being protected. The positive output terminal of the full wave bridge rectifier which includes the diodes D1 through D4 is connected to the positive conductor P1 through the resistor R28 to develop a unidirectional voltage across the resistor R28 which is directly proportional to and varies in a substantially linear manner with the ground current in the electrical system being protected. The negative output terminal of the full wave bridge type rectifier which includes the diodes D1 through D4 is connected to the common conductor N1.

More specifically, the ground current tripping circuit 600 includes a level detecting circuit 610 and a time delay circuit 620 which provides a substantially predetermined or fixed time delay between the time that the ground current exceeds substantially a predetermined or threshold value and the time that the trip coil 36 is energized through the output circuit 400. The level detecting circuit 610 of the ground current tripping circuit 600 is similar to the level detecting circuit 510 of the short delay tripping circuit 500, as just described. In particular, the input of the level detecting circuit 610 comprises the voltage dividing network which includes the resistors R26 and R27 which are connected in series with one another between the positive output terminal of the full wave bridge type rectifier which includes the diodes D1 through D4 and the positive conductor P3. The level detecting circuit 610 also includes the PNP transistors Q13 and Q14. The base of the transistor Q13 is connected to the junction point between the resistors R26 and R27, while the emitter of the transistor Q13 is connected to the positive conductor P1. In order to protect the emitter-base circuit of the transistor Q13 from excessive reverse bias by limiting the reverse emitter-base voltage, the diode D41 is connected between the base and the emitter of the transistor Q13 to limit the voltage between the emitter and the base to the forward voltage drop of the diode D41. The collector of the transistor Q13 is connected to the common conductor N1 through the collector load resistor R29 and also to the base of the transistor Q14. The emitter of the transistor Q14 is connected to the positive conductor P1, while the collector of the transistor Q14 is connected to the common conductor N1 through the collector load resistor R30. The collector of the transistor Q14 is also connected to the upper side of the timing capacitor C10 through the diode D44. In order to delay the reset of the ground current tripping circuit 600 after the ground current exceeds substantially a predetermined or threshold value and then instantaneously decreases below the predetermined or threshold value, the capacitor C9 is connected between the emitter and the collector of the transistor Q14.

The time delay circuit 620 of the ground current tripping circuit 600 comprises the rheostat R43 and the resistor R31 which are connected in series with one another between the positie conductor P1 and the timing capacitor C10 which, in turn, is connected in series with the rheostat R43 and the resistor R31 between the positive conductor P1 and the common conductor N1. The upper side of the timing capacitor C10 is also connected to the emitter of the transistor Q15 which forms part of the output level detecting circuit 410 of the output circuit 400 through the normally reverse biased or blocked diode D43. It is to be noted that the ground current tripping circuit 600 is of the type which is disclosed and claimed in copending application Ser. No. 765,583, filed concurrently by J. D. Watson and which is assigned to the same assignee as the present application.

In order to prevent the control means 270 which comprises the transistor Q10 and which forms part of the level detecting circuit 260 of the long time delay tripping circuit 200 from forming a low resistance path between the cathode of the diode D43 and the common conductor N1 during the operation of the ground current tripping circuit 600 which will thereby prevent the ground current tripping circuit 600 from actuating the operation of the output circuit 400, the diode D42 is connected between the collector of the transistor Q14 and the base of the transistor Q10 which forms part of the control means 270 of the level detecting circuit 260 of the long time delay tripping circuit 200.

In the operation of the ground current tripping circuit 600, as long as the ground current in the electrical system being protected remains below substantially a predetermined or threshold value, as sensed by the transformer T4, the emitter-base circuit of the transistor Q13 will be formed biased since the voltage at the emitter of the transistor Q13 which is the same as the regulated voltage at the positive conductor P1 will be greater than the voltage at the base of the transistor Q13 which is equal to the voltage at the positive conductor P3 plus the voltage drop across the resistor R27. As long as the transistor Q13 remains in a substantially saturated condition due to the forward biasing of its emitter-base circuit, the emitter-collector current of the transistor Q13 will produce a voltage drop across the resistor R29 which results in a substantially zero voltage bias of the base-emitter junction of the transistor Q14 and transistor Q14 will be maintained in the normally substantially nonconducting condition. As long as the transistor Q14 is substantially nonconducting, the voltage drop across the resistor R30 will be at a relatively low value and the diode D44 will be forward biased due to the voltage at the positive conductor P1 which is applied to the anode of the diode D44 through the rheostat D43 and the resistor R31. As long as the diode D44 is forward biased, the timing capacitor C10 will not be permitted to accumulate a charge from the positive conductor P1 through the rheostat R43 and the resistor R31 since the current flow from the conductor P1 through the rheostat R43 and the resistor R31 will be diverted away from the capacitor C10 to the common conductor N1 through the diode D44 and the resistor R30. It is to be noted that as long as the transistor Q14 remains in a substantially nonconducting condition, the capacitor C9 will charge up to a voltage which is equal to the voltage difference between the conductors P1 and N1 less the relatively low voltage drop across the resistor R30. It is also to be noted that as long as the diode D44 remains forward biased, the voltage at the upper side of the capacitor C10 will be equal to the forward voltage drop across the diode D44 and the relatively low voltage drop across the resistor R30 so that the diode D43 will be reverse biased or blocked since the voltage at the emitter of the transistor Q15 is maintained at a positive voltage with respect to the common conductor N1 by the diode D46, the resistor R35 and the diode D45 which are connected in a series circuit to the positive conductor P3.

In the operation of the ground current tripping circuit 600 when the ground current exceeds substantially a predetermined or threshold value to which said circuit is adjusted to respond by the values of the components of the level detecting circuit 610, and the corresponding substantially a corresponding predetermined or threshold value, the voltage at the base of transistor Q13 will increase sufficiently to reverse bias the emitter-base circuit of the transistor Q13 which will then be actuated to a substantially nonconducting condition. When the transistor Q13 is actuated to a substantially nonconducting condition, the current in the emitter-collector path of the transistor Q13 will decrease to a negligible value and the current which flows in the resistor R29 will now flow from the positive conductor P1 through the emitter-base circuit of the transistor Q14. The transistor Q14 will then be actuated to a substantially saturated condition. When the transistor Q14 is actuated to a saturated condition, the emitter-collector current will increase to thereby increase the voltage drop across the resistor R30 sufficiently to reverse bias or block the diode D44 which will then permit the timing capacitor C10 to start accumulating a charge from the positive conductor P1 through the rheostat R43 and the resistor R31. If permitted to do so by the continuing of the ground current to exceed the predetermined or threshold value, the voltage across the timing capacitor C10 will gradually increase after a predetermined time delay to a value which is sufficient to forward bias the diode D43. It is to be noted that since the charging of the capacitor C10 is from the regulated voltage between the conductors P1 and N1 through the rheostat R43 and the resistor R31, the time delay provided by the time delay circuit 620 will be substantially a predetermined or fixed value after the charging of the capacitor C10 is started by the operation of the level detecting circuit 610, as just described. When the diode D43 is forward biased by the voltage across the capacitor C10, a current will flow from the positive conductor P1 through the rheostat R43, the resistor R31 and the diode D43 to the emitter of the transistor Q15 which forms part of the output level detecting circuit 410 of the output circuit 400 which will then be actuated to energize the trip coil 36 of the circuit breaker CB and to actuate said circuit breaker to an open condition.

If the ground current exceeds the predetermined or threshold value necessary to actuate the transistor Q14 to a substantially saturated condition, the capacitor C9 will be rapidly discharged through the emitter-collector path of the transistor Q14. If the ground current exceeds the predetermined or threshold value necessary to actuate the transistor Q14 to a substantially saturated condition and then instantaneously decreases below the predetermined or threshold value, the capacitor C9 will gradually charge through the resistor R30 until the diode D44 is forward biased to thereby rapidly discharge or reset the timing capacitor C10 if the voltage across the capacitor C10 has not yet reached the value necessary to forward bias the diode D43. The time delay in the resetting of the ground current tripping circuit following the end of a ground current which exceeded the predetermined value necessary to actuate the operation of the level detecting circuit 610 is for a time period which may be slightly longer than one-half cycle of the alternating current which flows in the conductors L1, L2 and L3 is determined by the values of the capacitor C9, the resistor R30 and the voltage between the conductors P1 and N1. In other words, if the ground current in the circuit being protected exceeds the predetermined or threshold value and then continues without interruption longer than the resetting time delay of the level detecting circuit 610, the charging of the capacitor C10 will continue in an uninterrupted manner until the fixed time delay of the circuit 620 is completed. The time delay which is substantially a predetermined or fixed value in the operation of the ground current tripping circuit 600, as just described, may be continuously varied between a minimum value and a maximum value by the adjustment of the rheostat R43 which forms part of the time delay circuit 620 of the ground current tripping circuit 600.

As previously mentioned, it is to be noted that in the operation of the ground current tripping circuit 600, each time that the transistor Q14 is actuated from a substantially nonconducting condition to a substantially saturated condition in response to a predetermined ground current occurring in the electrical system being protected, the voltage drop across the resistor R30 which increases with increased current flow in the emitter-collector path of the transistor Q14 results in a higher positive voltage at the anode of the diode D42 with respect to the conductor N1 which is transmitted to the base of the transistor Q10 through the diode D42. This change in voltage actuates the transistor Q10 to a substantially nonconducting condition to prevent the control means 270 from forming a low resistance path to the common conductor N1 which would otherwise divert the output current from the ground current tripping circuit 600 away from the emitter of the transistor Q15 of the output level detecting circuit 410 to thereby prevent the ground current tripping circuit 600 from actuating the operation of the output circuit 400. This circuit arrangement is necessary since the level detecting circuit 260 of the long time delay tripping circuit 200 may not actuate the control means 270 which comprises the transistor Q10 to a substantially nonconducting condition even though the ground current in the electrical system which includes the conductors L1, L2 and L3 may have a predetermined ground current flow which is sufficient to actuate the operation of the ground current tripping circuit 600 where provided. It is to be noted that the control means which comprises the transistor Q10 would necessarily be actuated to a substantially nonconducting condition prior to the operation of either the instantaneous tripping circuit 300 or the short delay tripping circuit 500 since the predetermined current to which the instantaneous tripping circuit 300 responds or the predetermined instantaneous current to which the short delay tripping circuit 500 responds is normally greater than and determines the upper limit of the range of overload currents to which the long time delay tripping circuit 200 responds.

It is important to note that the level detecting circuit 260 of the long time delay tripping circuit 200, the level detecting circuit or means 510 of the short delay tripping circuit 500 and the level detecting circuit 610 of the ground current tripping circuit 600 are all of the type disclosed in greater detail in the copending application Ser. No. 765,582 of J. D. Watson previously mentioned in connection with the long time delay tripping circuit 200.

It is to be understood that a protective device as disclosed may include first and second instantaneous tripping circuits which will be identical to the instantaneous tripping circuit 300 previously described in detail except that the first and second instantaneous tripping circuits would be adjusted to respond to different values of instantaneous currents and only one of the instantaneous tripping circuits would be electrically connected to an auxiliary contact means, such as the auxiliary contact means AC1 as disclosed, to thereby render only one of the instantaneous tripping circuits inoperative upon the closing and latching in of the main contacts of the associated circuit breaker. For example, where two instantaneous tripping circuits are provided as just indicated, one of the instantaneous tripping circuits may be adjusted to respond to a predetermined instantaneous current which is coordinated with the closing capabilities of the associated circuit breaker and rendered inoperative after the main contacts of the associated circuit breaker are closed and latched in while the other instantaneous tripping circuit may be adjusted to respond to a relatively higher instantaneous current after the main contacts of the circuit breaker are closed without being rendered inoperative by an auxiliary contact means such as would be used with the first instantaneous tripping circuit. This is to take advantage of the current interrupting capability of a particular circuit breaker which may be designed to be relatively greater than the maximum current against which the circuit breaker is capable of closing and latching in the main contacts in. Such a modified protective device would be particularly adapted to an electrical system in which a relatively large main breaker is associated with a plurality of branch circuit breakers which are normally closed prior to the closing of the main circuit breaker since the main circuit breaker would then require a relatively lower closing capability with respect to the maximum current against which the main contacts of the main circuit breaker could be closed and latched in which is relatively less than the maximum current which the main circuit breaker is capable of interrupting.

The circuits and apparatus embodying the teachings of this invention have several advantages. For example, a circuit breaker including a protective device as disclosed is capable of discriminating between open and closed operating positions of the circuit breaker to modify the operating characteristics of the protective device to thereby cooridnate the operating characteristics of the protective device with respect to the open and closed conditions of the associated circuit breaker. As previously mentioned, a particular circuit breaker may be designed to be capable of interrupting a relatively larger current than the maximum current against which the closing or operating mechanism of the circuit breaker is capable of closing and latching in the main contacts of the circuit breaker. Since a circuit breaker including a protective device as disclosed may be closely coordinated with the operating requirements in a particular application with respect to the closing and interrupting requirements of the circuit breaker, the closing forces involved in the operation of the circuit breaker may be reduced to thereby reduce the requirements of the operating mechanism as far as the closing function. A final advantage of the circuit breaker including a protective device as disclosed is that a circuit breaker may be employed to protect an electrical system having a relatively greater fault current capacity than the maximum current which the circuit breaker is capable of closing against as required in a particular application.

Since numerous changes may be made in the above described circuits and apparatus and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A circuit breaker comprising relatively movable main contacts, operating means for opening and closing said main contacts, an overcurrent protective device disposed to be responsive to the current in said main contacts and operaitvely connected to said operating means for producing an output to actuate said operating means to open said contracts, said protective device including first means responsive to said current for actuating said protective device to produce said output substantially instantaneously when said current exceeds substantially a first predetermined value and second means responsive to said current for independently actuating said protective device to produce said output after a predetermined time delay, and auxiliary contact means actuable by said operating means to move between first and second operating positions after said main contacts are closed by said operating means, said auxiliary contact means being connected to said first means to render said first means inoperative to actuate said protective device to produce said output when said main contacts are closed by said operating means.

2. The combination as claimed in claim 1 wherein said first means comprises a level detecting circuit responsive to said current for producing an additional output substantially instantaneously when said current exceeds substantially said first predetermined value.

3. The combination as claimed in claim 1 wherein said protective devices includes a common output circuit connected to said first and second means for producing said output when actuated by said first and second means.

4. The combination as claimed in claim 3 wherein said first means comprises a level detecting circuit responsive to said current for producing an additional output substantially instantaneously when said current exceeds substantially said first predetermined value.

5. A circuit breaker comprising relatively movable main contacts, operating means for opening and closing said contacts, an overcurrent protective device disposed to be responsive to the current in said contacts and operatively connected to said operating means for producing an output to actuate said operating means to open said contacts, said protective device including first and second means responsive to said current for actuating said protective device to produce said output substantially instantaneously when said current exceeds substantially first and second predetermined values, respectively, and auxiliary contact means actuable by said operating means to move between first and second operating positions after said main contacts are closed by said operating means, said auxiliary contact means being connected to said first means to render said first means inoperative when siad main contacts are closed.

6. The combination as claimed in claim 5 wherein said second predetermined value of said current is relatively greater than said first predetermnied value of said current.

References Cited

UNITED STATES PATENTS

| Re. 25,762 | 4/1965 | Kotheimer | 317—36 |
| 3,262,017 | 7/1966 | Ashendew et al. | 317—36 X |
| 3,329,870 | 7/1967 | Viney et al. | 3 17—36 |
| 3,419,757 | 12/1968 | Steen | 317—36 |

JAMES D. TRAMMEL, Primary Examiner

U.S. Cl. X.R.

317—50, 142